(12) United States Patent
Tomita et al.

(10) Patent No.: US 9,880,508 B2
(45) Date of Patent: Jan. 30, 2018

(54) DRIVE TRANSMISSION DEVICE AND IMAGE FORMING APPARATUS INCORPORATING SAME

(71) Applicants: Kenji Tomita, Tokyo (JP); Kentaro Uji, Kanagawa (JP)

(72) Inventors: Kenji Tomita, Tokyo (JP); Kentaro Uji, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/180,162

(22) Filed: Jun. 13, 2016

(65) Prior Publication Data

US 2016/0378049 A1    Dec. 29, 2016

(30) Foreign Application Priority Data

Jun. 26, 2015 (JP) .................. 2015-129180
Sep. 4, 2015 (JP) .................. 2015-174688
Dec. 1, 2015 (JP) .................. 2015-234458

(51) Int. Cl.
*G03G 15/00* (2006.01)
*F16D 1/10* (2006.01)
*G03G 21/16* (2006.01)

(52) U.S. Cl.
CPC ............. *G03G 15/757* (2013.01); *F16D 1/10* (2013.01); *G03G 21/1647* (2013.01); *G03G 2221/1657* (2013.01)

(58) Field of Classification Search
CPC ................................ G03G 15/757; F16D 1/10
See application file for complete search history.

(56) References Cited

U.S. PATENT DOCUMENTS

2013/0308981 A1    11/2013   Harayama et al.

FOREIGN PATENT DOCUMENTS

| JP | 2006-350285 | 12/2006 |
| JP | 2013195961 A * | 9/2013 |
| JP | 2014-231904 | 12/2014 |

OTHER PUBLICATIONS

Sakurai et al. (JP 2013-195961 A), Sep. 2013, JPO Computer Translation.*
U.S. Office Action dated Oct. 3, 2017 for U.S. Appl. No. 15/701,476.

* cited by examiner

*Primary Examiner* — Erika J Villaluna
(74) *Attorney, Agent, or Firm* — Harness, Dickey & Pierce, P.L.C.

(57) ABSTRACT

A drive transmission device includes a first rotary body coupled to a drive source, a second rotary body that receives a drive force transmitted from the drive source, a coupling that couples the first rotary body and the second rotary body, and a spring that presses the coupling toward the second rotary body. Each of the first rotary body and the second rotary body includes a plurality of grooves. The coupling has axially opposed first end and second end coupled to the first rotary body and the second rotary body, respectively. The coupling includes a plurality of couplers on a circumferential surface of each of the first end and the second end. The plurality of couplers are axially movable into and out of the plurality of grooves of each of the first rotary body and the second rotary body. The coupling has a spherical end face at the second end.

12 Claims, 22 Drawing Sheets

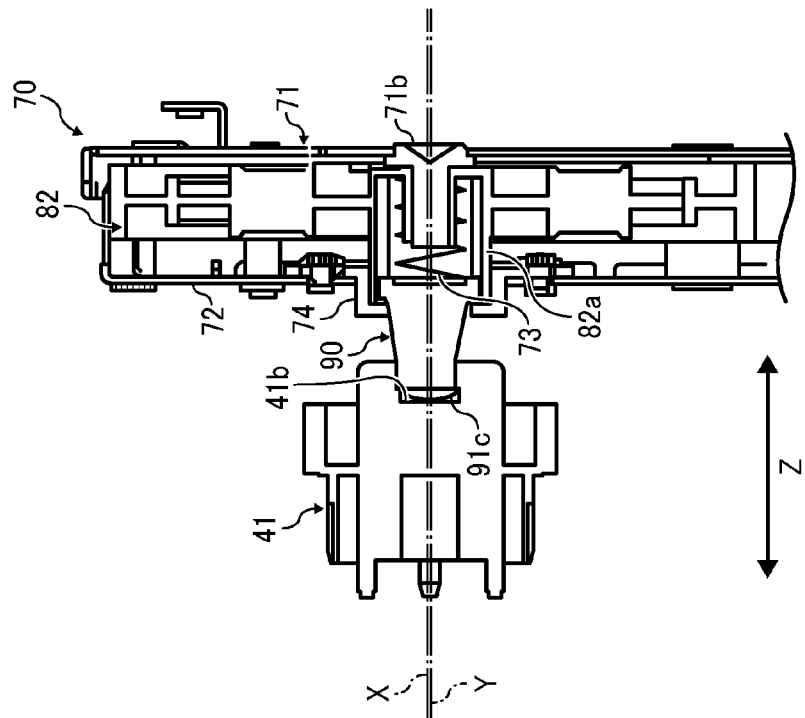
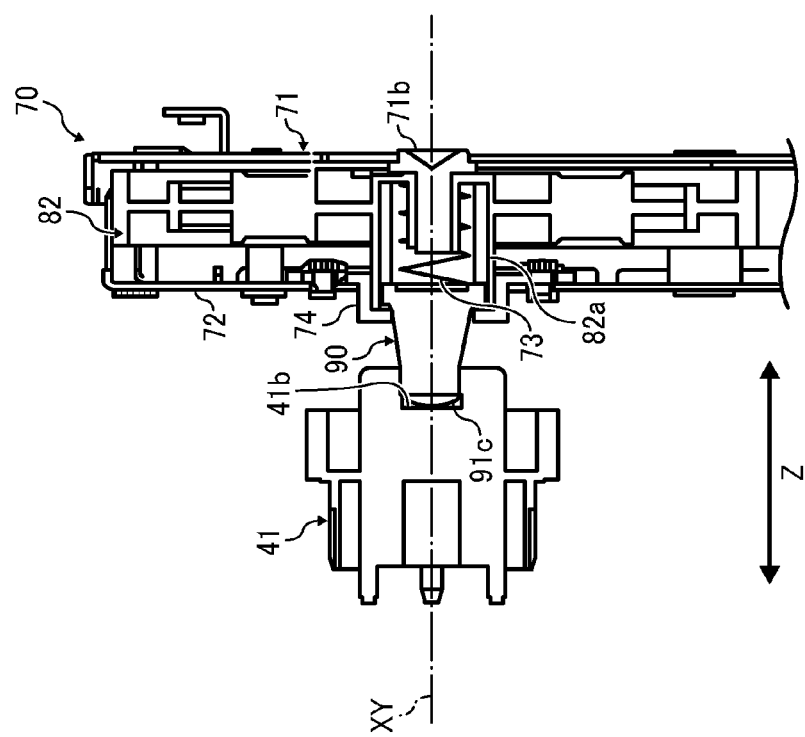

DRIVE TRANSMISSION DEVICE AND IMAGE FORMING APPARATUS INCORPORATING SAME

CROSS-REFERENCE TO RELATED APPLICATIONS

This patent application is based on and claims priority pursuant to 35 U.S.C. § 119(a) to Japanese Patent Application Nos. 2015-129180, filed on Jun. 26, 2015, 2015-174688, filed on Sep. 4, 2015, and 2015-234458, filed on Dec. 1, 2015, in the Japan Patent Office, the entire disclosure of each of which is hereby incorporated by reference herein.

BACKGROUND

Technical Field

Embodiments of this disclosure generally relate to a drive transmission device and an image forming apparatus incorporating the drive transmission device.

Related Art

Various types of electrophotographic image forming apparatuses are known, including copiers, printers, facsimile machines, and multifunction machines having two or more of copying, printing, scanning, facsimile, plotter, and other capabilities. Such image forming apparatuses usually form an image on a recording medium according to image data. Specifically, in such image forming apparatuses, for example, a charger uniformly charges a surface of a photoconductor serving as an image carrier. An optical writer irradiates the surface of the photoconductor thus charged with a light beam to form an electrostatic latent image on the surface of the photoconductor according to the image data. A development device supplies toner to the electrostatic latent image thus formed to render the electrostatic latent image visible as a toner image. The toner image is then transferred onto a recording medium directly, or indirectly via an intermediate transfer belt. Finally, a fixing device applies heat and pressure to the recording medium carrying the toner image to fix the toner image onto the recording medium. Thus, the image is formed on the recording medium.

Such image forming apparatuses generally include rotary bodies such as a photoconductor and a developing roller, and form an image by rotating the rotary bodies. Such rotary bodies are often removably mountable relative to a main body of the image forming apparatus. Therefore, the drive transmission device, which transmits a driving force from a drive source of the main body to the rotary bodies, includes a coupling that releasably couples the drive source and the rotary bodies.

SUMMARY

In one embodiment of this disclosure, a novel drive transmission device is described that includes a first rotary body, a second rotary body, a coupling, and a spring. The first rotary body is coupled to a drive source, and includes a plurality of grooves. The second rotary body receives a drive force transmitted from the drive source, and includes a plurality of grooves. The coupling has a first end coupled to the first rotary body and a second end axially opposed to the first end and coupled to the second rotary body, and couples the first rotary body and the second rotary body. The coupling includes a plurality of couplers on a circumferential surface of each of the first end and the second end. The plurality of couplers are axially movable into and out of the plurality of grooves of each of the first rotary body and the second rotary body. The coupling has a spherical end face at the second end. The spring presses the coupling toward the second rotary body from the first rotary body.

Also described is an image forming apparatus incorporating the drive transmission device.

BRIEF DESCRIPTION OF THE DRAWINGS

A more complete appreciation of the disclosure and many of the attendant advantages thereof will be more readily obtained as the same becomes better understood by reference to the following detailed description of embodiments when considered in connection with the accompanying drawings, wherein:

FIG. 9A is a cross-sectional view of the drive transmission device, illustrating the flange and the second gear coaxially positioned while being coupled by the joint having a spherical leading-end face;

FIG. 9B is a cross-sectional view of the drive transmission device, illustrating an axial center of the photoconductor flange and an axial center of the second gear misaligned while the photoconductor flange and the second gear are coupled by the joint having a spherical leading-end face;

Figure 1:
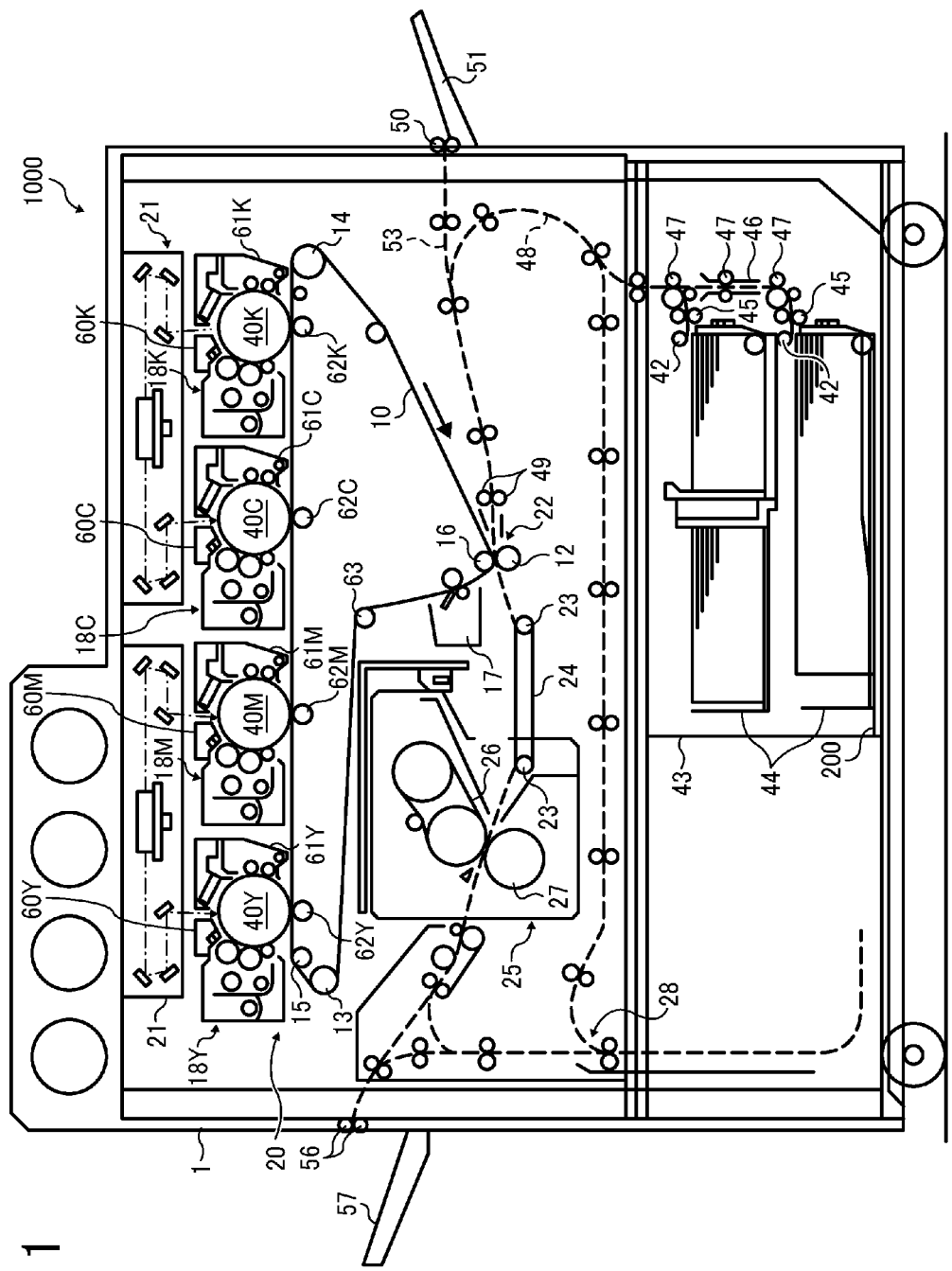
FIG. 1 is a schematic view of an image forming apparatus according to an embodiment of this disclosure.

The accompanying drawings are intended to depict embodiments of this disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and not all of the components or elements described in the embodiments of this disclosure are indispensable.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

Referring now to the drawings, wherein like reference numerals designate identical or corresponding parts throughout the several views, embodiments of this disclosure are described below.

Initially with reference to FIG. 1, a description is given of an electrophotographic image forming apparatus 1000 according to an embodiment of this disclosure. FIG. 1 is a schematic view of the image forming apparatus 1000.

The image forming apparatus 1000 illustrated in FIG. 1 is a tandem image forming apparatus using an intermediate transfer system. The image forming apparatus 1000 includes a main body 1 disposed on a sheet-feeding table 200 serving as a sheet feeder that stores and feeds recording media. It is to be noted that suffixes Y, M, C, and, K denote colors yellow, magenta, cyan, and black, respectively. To simplify the description, the suffixes Y, M, C, and, K indicating colors are omitted herein unless otherwise specified.

Substantially in the center of the main body 1 of the image forming apparatus 1000, an intermediate transfer belt 10, serving as a belt-type image bearer and as an intermediate transferor, is entrained around a plurality of support rollers 13, 14, 15, 16 and 63, and is formed into an endless loop. The intermediate transfer belt 10 is rotatable in a clockwise direction in FIG. 1. The image forming apparatus 1000 includes a belt cleaner 17 for the intermediate transfer belt 10. As illustrated in FIG. 1, the belt cleaner 17 is disposed at the left side of a secondary-transfer opposing roller 16 serving as one of the support rollers. The belt cleaner 17 removes residual toner remaining on the intermediate transfer belt 10 after image transfer. The image forming apparatus 1000 also includes a tandem image forming unit 20 in which four toner image forming stations 18Y, 18M, 18C, and 18K are arranged in tandem horizontally above the looped intermediate transfer belt 10 along the direction of movement of the intermediate transfer belt 10 stretched taut between the support rollers 14 and 15.

As illustrated in FIG. 1, an optical writing unit or an exposure unit 21 serving as an optical writing device is disposed above the tandem image forming unit 20. The toner image forming stations 18Y, 18M, 18C, and 18K in the tandem image forming unit 20 include drum-shaped photoconductors 40Y, 40M, 40C, and 40K serving as image bearers. Latent images of the colors yellow, magenta, cyan, and black are formed on the photoconductors 40Y, 40M, 40C, and 40K, respectively. Each surface of the photoconductors 40Y, 40M, 40C, and 40K is charged uniformly by charging devices 60Y, 60M, 60C, and 60K. Subsequently, based on image data, the photoconductors 40Y, 40M, 40C, and 40K are exposed by the exposure unit 21, thereby forming the latent images on the surfaces of the photoconductors 40Y, 40M, 40C, and 40K, respectively.

The latent images on the photoconductors 40Y, 40M, 40C, and 40K are developed with respective color of toner by developing devices 61Y, 61M, 61C, and 61K, thereby forming visible images, also known as toner images, on the surfaces of the photoconductors 40Y, 40M, 40C, and 40K. Primary transfer rollers 62Y, 62M, 62C, and 62K are disposed opposite the photoconductors 40Y, 40M, 40C, and 40K with the intermediate transfer belt 10 interposed therebetween, thereby forming primary transfer nips at which toner images are transferred from the photoconductors 40Y, 40M, 40C, and 40K onto the intermediate transfer belt 10. The support roller 14 is a drive roller that rotates the intermediate transfer belt 10. When forming a single color image of black color on the intermediate transfer belt 10, rollers other than the drive roller 14, i.e., the support rollers 13 and 15, are moved such that the photoconductors 40Y, 40M, and 40C for the colors yellow, magenta, and cyan are separated from the intermediate transfer belt 10.

A secondary transfer unit 22 is disposed opposite the tandem image forming unit 20 via the intermediate transfer belt 10. The secondary transfer unit 22 includes a secondary-transfer opposing roller 16 and a secondary transfer roller 12. In FIG. 1, the secondary transfer roller 12 is pressed against the secondary-transfer opposing roller 16 to apply a transfer electric field thereto. Accordingly, a toner image is transferred from the intermediate transfer belt 10 onto a recording medium.

A fixing unit 25 is disposed next to the secondary transfer unit 22. The fixing unit 25 serving as a fixing mechanism fixes the toner image transferred on the recording medium. The fixing unit 25 includes a fixing belt 26 and a pressing roller 27. The fixing belt 26 is formed into an endless loop to transport the recording medium. The pressing roller 27 serving as a pressing member is pressed against the fixing belt 26. A conveyor belt 24 serving as a recording medium conveyor is entrained around support rollers 23 and rotated. The recording medium bearing the toner image is transported to the fixing unit 25.

In FIG. 1, the image forming apparatus 1000 includes a reverser 28 substantially below the secondary transfer unit 22 and the fixing unit 25, parallel to the tandem image forming unit 20. The reverser 28 reverses a recording medium so as to form images on both sides of the recording medium.

In the image forming apparatus 1000 described above, image data is sent to the main body 1. Upon receiving a signal to start image formation, a drive motor rotates the support roller 14, causing other support rollers to follow the rotation of the support roller 14. Accordingly, the intermediate transfer belt 10 is rotated. In the meantime, the toner image forming stations 18Y, 18M, 18C, and 18K form single-color toner images of yellow, magenta, cyan, and black on the photoconductors 40Y, 40M, 40C, and 40K, respectively. As the intermediate transfer belt 10 travels, the single-color images are transferred from the photoconductors 40Y, 40M, 40C, and 40K onto the intermediate transfer belt 10 at the primary transfer nips or primary transfer positions such that the toner images are superimposed one atop the other, thereby forming a composite color toner image on the intermediate transfer belt 10.

In the sheet-feeding table 200 serving as a sheet feeder, one of sheet-feeding rollers 42 is selectively rotated to feed a recording medium from one of sheet trays 44 vertically disposed in a paper bank 43, and a separation roller 45 separates one sheet from the stack of recording media in the sheet tray 44 and feeds the sheet to a conveyance passage 46. The recording medium is transported and guided by conveyor rollers 47 to a conveyance passage 48 in the main body 1, and comes into contact with a pair of registration rollers 49. Then, the recording medium temporarily stops. Alternatively, a sheet-feeding roller 50 is rotated to pick up a recording medium on a bypass feeder 51 disposed at the lateral side of the main body 1. The recording medium is fed to a bypass conveyance passage 53 by a separation roller one by one. In this configuration, the recording medium also comes into contact with the pair of registration rollers 49 and stops temporarily. Subsequently, the pair of registration rollers 49 is timed to rotate again to send the recording medium such that the recording medium is aligned with the composite color toner image formed on the intermediate transfer belt 10 and at a secondary transfer nip at which the intermediate transfer belt 10 and the secondary transfer roller 12 of the secondary transfer unit 22 meet. Accordingly, the composite color toner image is transferred onto the recording medium at the secondary transfer nip in the secondary transfer unit 22. After the composite color toner image is transferred onto the recording medium, the recording medium is transported to the fixing unit 25, which applies heat and pressure to the recording medium bearing the unfixed toner image and fixes the unfixed toner image on the recording medium. After fixing, a sheet-ejection roller 56 ejects the recording medium onto a sheet-ejection tray 57. Alternatively, a switching projection switches the direction of delivery of the recording medium and directs the recording medium to the reverser 28 for duplex printing. The recording medium is then transported to the secondary transfer nip. After an image is recorded on the other side (second side) of the recording medium, the sheet-ejection roller 56 ejects the recording medium onto the sheet-ejection tray 57.

In the meantime, the belt cleaner 17 removes residual toner, which fails to be transferred onto the recording medium and therefore remaining on the intermediate transfer belt 10, from the intermediate transfer belt 10 after image transfer, in preparation for the subsequent image forming operation.

The image forming apparatus 1000 described above includes a front cover on the front side of the main body 1, which is the front side of the surface of the paper on which FIG. 1 is drawn. The front cover is hinged about a shaft and is openably closable with respect to the main body 1. By opening the front cover with respect to the main body 1, a photoconductor, a charging device, a developing device and a cleaning device, all of which are disposed inside the main body 1, are removably mountable as a single integrated unit.

When one or more of the photoconductor, the charging device, the developing device and the cleaning device reach the end of their product life cycles, the integrated unit is removed and replaced with a new unit. Accordingly, the drive transmission device, which transmits a driving force from a drive source such as a motor of the main body to the target rotary bodies such as the photoconductor, includes a joint serving as a coupling that removably couples the drive source and the rotary bodies.

A first comparative drive transmission device includes a coupling constituted of a pair of outer rings and a tripod member that couples the outer rings therebetween. The coupling couples a drive shaft and a rotor shaft, and transmits a driving force while restraining the fluctuation of rotational velocity caused by the deviation of angle and the misalignment between the drive shaft and the rotor shaft. Each of the outer rings has three grooves extending in an axial direction on an inner circumference. The tripod member has three projections on axially opposed ends. The three projections are housed in the respective track grooves slidably in the axial direction for transmission of a torque around the shaft between the outer rings and the tripod member. Such a coupling constituted of a pair of outer rings and a tripod member minimizes the rotational irregularity caused by the deviation of angle and the misalignment between the drive shaft and the rotor shaft.

A second comparative drive transmission device includes a compression spring having one end contacting a trailing end of a coupling that is coupled to a rotated member and the other end contacting a side of a gear that transmits a driving force from a drive motor. A force from the compression spring presses the coupling toward the rotated member, thereby restraining separation of the coupling and the rotated member from each other during drive coupling.

However, use of the coupling of the first comparative drive transmission device with the compression spring of the second comparative drive transmission device might cause rotational irregularity due to the fluctuation of the force of the spring in a direction in which a thrust is generated.

According to embodiments of this disclosure, such rotational irregularity is minimized.

It is to be noted that, in the embodiments described below, descriptions are given of a drive transmission device, included in the main body 1 of the image forming apparatus 1000, for transmission of a driving force to the photoconductor 40 as a target, for example. However, the target may be another device such as a developing roller or a toner supply screw of the developing device 61, or the sheet-feeding roller 42 of the sheet-feeding table 200.

Figure 2:
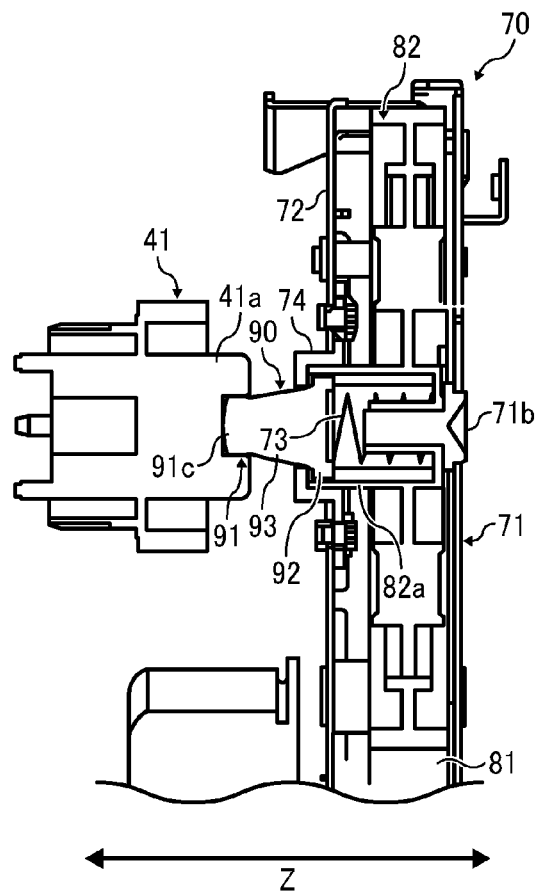
FIG. 2 is a cross-sectional view of a drive transmission device according to a first embodiment incorporated in the image forming apparatus of FIG. 1.
Figure 3:
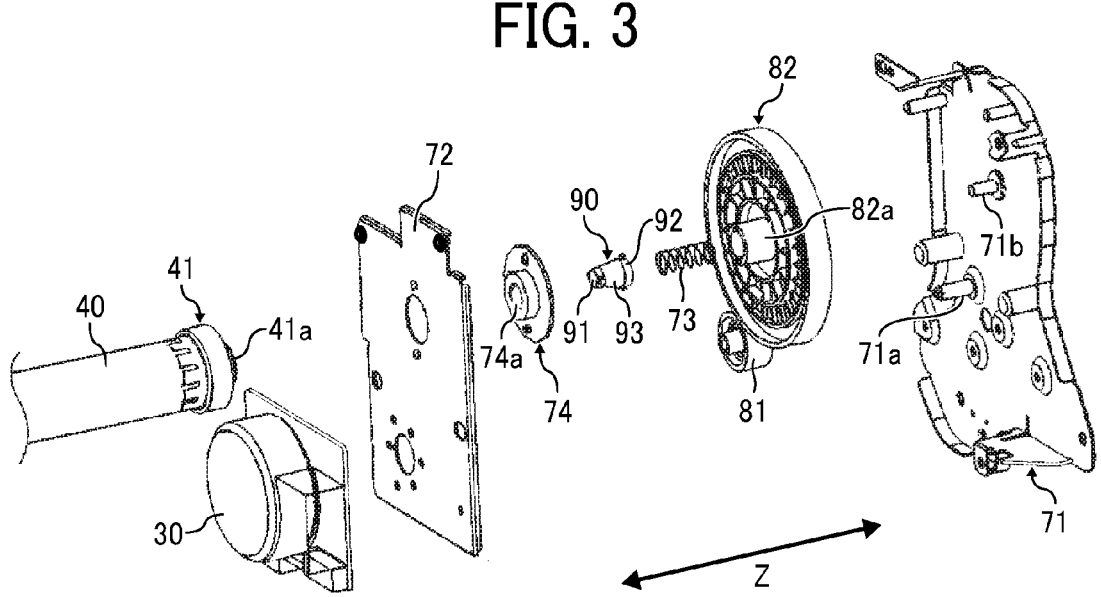
FIG. 3 is an exploded view of the drive transmission device of FIG. 2.

Referring now to FIGS. 2 through 9B, a description is given of a drive transmission device 70 incorporated in the image forming apparatus 1000, according to a first embodiment. FIG. 2 is a cross-sectional view of the drive transmission device 70. FIG. 3 is an exploded view of the drive transmission device 70. FIG. 4A is a perspective view of a flange 41 for the photoconductor 40, incorporated in the drive transmission device 70. FIG. 4B is a perspective view of a second gear 82 incorporated in the drive transmission device 70.

With reference to FIGS. 2 through 4B, a description is given of a configuration of front and rear components, in a drive sequence, of a joint 90 incorporated in the drive transmission device 70.

The drive transmission device 70 according to the present embodiment transmits a drive force from a drive motor 30 to the photoconductor 40 via a first gear 81, the second gear 82, the joint 90, and the flange 41. The first gear 81 and the second gear 82 are rotatably supported by shafts 71a and 71b of a first bracket 71, respectively. The drive motor 30 is supported by a second bracket 72. The second bracket 72 is combined with a holder 74 that holds the joint 90 while regulating the movement of the joint 90 and the second gear 82 in an axial direction Z. The second gear 82, the joint 90 and the flange 41 are positioned on a common axis. The joint 90 releasably couples the second gear 82 and the flange 41 in the axial direction Z.

Figure 5:
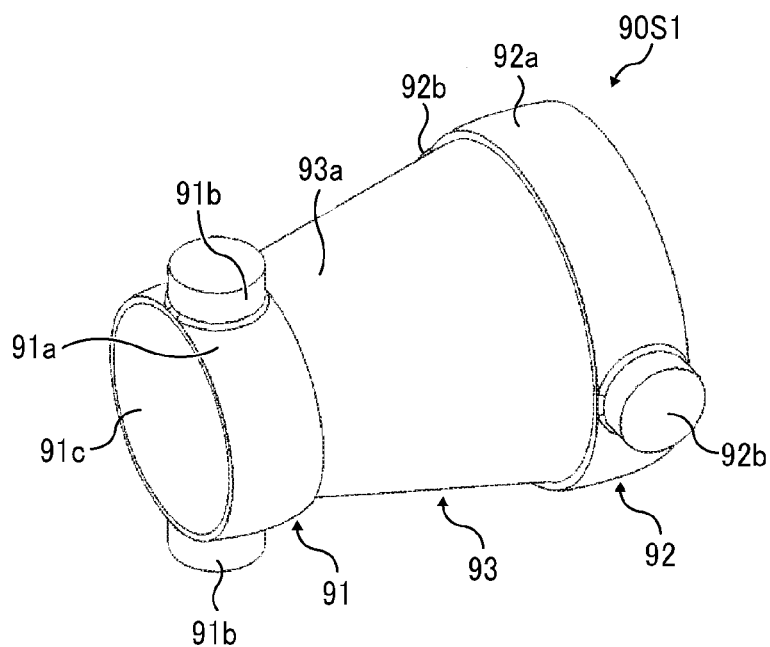
FIG. 5 is a perspective view of a variation of a joint incorporated in the drive transmission device of FIG. 2.

Referring now to FIG. 5, a description is given of an exemplary configuration of the joint 90. FIG. 5 is a perspective view of a joint 90S1 as a variation of the joint 90.

The joint 90S1 includes a leading-end coupling portion 91 and a trailing-end coupling portion 92. The leading-end coupling portion 91 is an end, serving as a second end, of the joint 90S1 axially facing the flange 41 to be coupled with the flange 41. The trailing-end coupling portion 92 is an end, serving as a first end, of the joint 90S1 axially facing the second gear 82 to be coupled with the second gear 82. The joint 90S1 also includes a truncated cone portion 93 between the leading-end coupling portion 91 and the trailing-end coupling portion 92 in the axial direction Z. The truncated cone portion 93 includes a circumferential surface 93a inclined with respect to the axial direction Z such that a radius of the circumferential surface 93a gradually increases from a leading-end coupling portion 91 side to a trailing-end coupling portion 92 side. The leading-end coupling portion 91 includes a spherical circumferential surface 91a and two leading-end projections 91b serving as a plurality of cylindrical couplers projecting from the circumferential surface 91a. The trailing-end coupling portion 92 includes a spherical circumferential surface 92a and two trailing-end projections 92b serving as a plurality of cylindrical couplers projecting from the circumferential surface 92a. Although each of the leading-end coupling portion 91 and the trailing-end coupling portion 92 includes two projections in the present embodiment, the number of the projections can be any number.

Referring back to FIGS. 4A and 4B, a description is given of the flange 41 and the second gear 82.

Figure 4A:
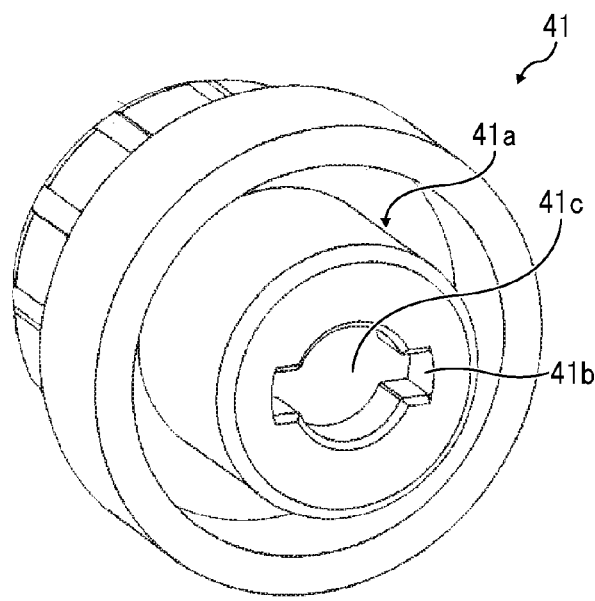
FIG. 4A is a perspective view of a flange for a photoconductor, incorporated in the drive transmission device of FIG. 2.
Figure 4B:
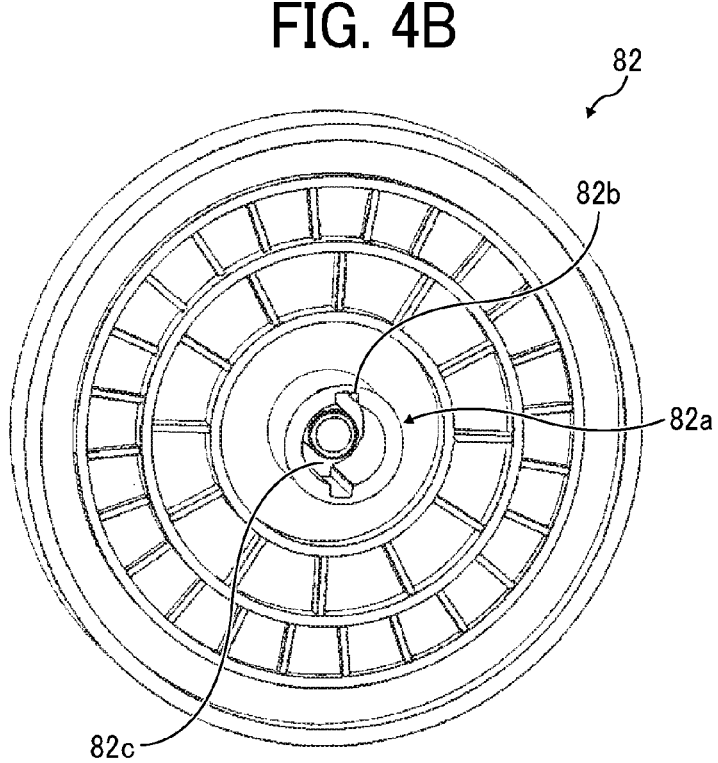
FIG. 4B is a perspective view of a second gear incorporated in the drive transmission device of FIG. 2.

As illustrated in FIG. 4A, the flange 41 includes a coupled portion 41a, into which the leading-end coupling portion 91 of the joint 90 is inserted to be coupled with the coupled portion 41a. The coupled portion 41a includes two grooves 41b and a contact portion 41c. The two leading-end projections 91b of the joint 90 are movably fitted into the respective grooves 41b in the axial direction Z. The contact portion 41c contacts a leading-end face 91c of the joint 90, which is an end face of the leading-end coupling portion 91. As illustrated in FIG. 4B, the second gear 82 includes a coupled portion 82a, into which the trailing-end coupling portion 92 of the joint 90 is inserted to be coupled with the coupled portion 82a. Two grooves 82b are formed such that the two trailing-end projections 92b of the joint 90 are movably fitted into the respective grooves 82b in the axial direction Z. Accordingly, the coupled portion 41a of the flange 41 is coupled with the leading-end coupling portion 91 of the joint 90. Similarly, the coupled portion 82a of the second gear 82 is coupled with the trailing-end coupling portion 92 of the joint 90. Thus, the second gear 82, the joint 90 and the photoconductor 40 are linked together.

A compression coil spring 73 is disposed between the trailing-end coupling portion 92 of the joint 90 and the second gear 82. An end of the compression coil spring 73 contacts a side face 82c located inside the coupled portion 82a of the second gear 82. The other end of the compression coil spring 73 contacts an end face of the trailing-end coupling portion 92 of the joint 90, which is a trailing end of the joint 90. The compression coil spring 73 applies a force to the joint 90 and presses the joint 90 toward the flange 41, thereby preventing separation of the joint 90 from the flange 41 during drive coupling.

As illustrated in FIG. 3, the circular holder 74 has an insertion hole 74a in the center into which the joint 90 is inserted. By securing the first bracket 71 and the second bracket 72 to each other, the trailing-end coupling portion 92 of the joint 90 contacts an edge of the insertion hole 74a of the holder 74 attached to the second bracket 72. Accordingly, the holder 74 regulates the movement of the joint 90 toward the flange 41 in the axial direction Z, thereby preventing the compression coil spring 73 from pushing out the joint 90.

Figure 6:
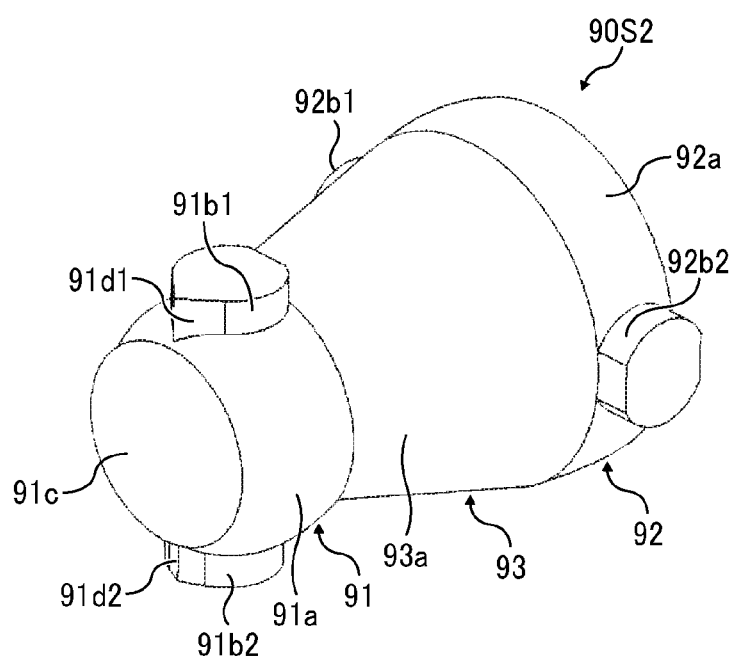
FIG. 6 is a perspective view of another variation of the joint incorporated in the drive transmission device of FIG. 2.
Figure 7:
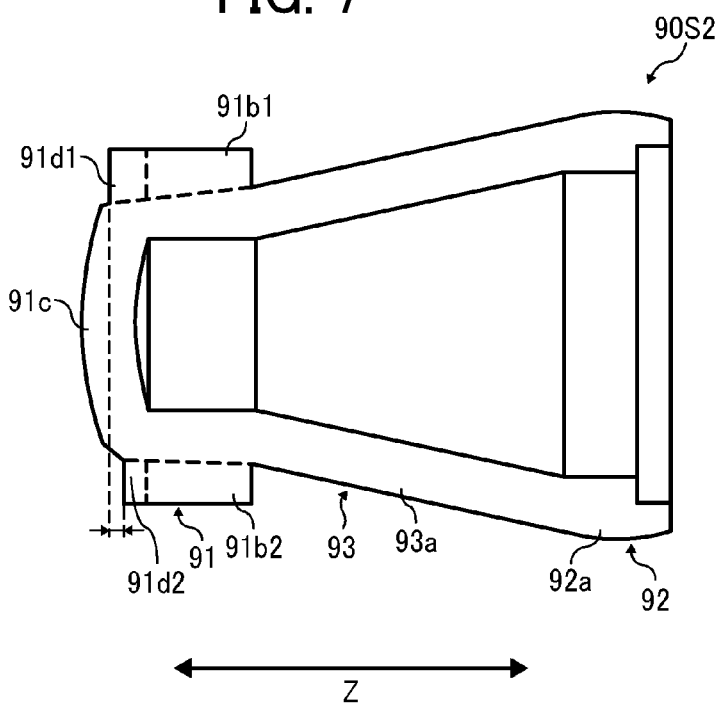
FIG. 7 is a cross-sectional view of the joint of FIG. 6.

Referring now to FIGS. 6 and 7, a description is given of another exemplary configuration of the joint 90. FIG. 6 is a perspective view of a joint 90S2 as another variation of the joint 90.

The joint 90S2 includes two leading-end projections 91b1 and 91b2 having different radii. For example, as illustrated in FIG. 6, the leading-end projection 91b1 has a larger radius than the leading-end projection 91b2. Similarly, the joint 90S2 includes two trailing-end projections 92b1 and 92b2 having different radii. Specifically, one of the two trailing-end projections 92b1 and 92b2 has a larger radius than the other. As illustrated in FIG. 6, the two leading-end projections 91b1 and 91b2 have tapered portions 91d1 and 91d2, respectively, on an axially leading-end side of the joint 90S2. The tapered portions 91d1 and 91d2 serve as guides for insertion of the leading-end projections 91b1 and 91b2 into the grooves 41b of the flange 41. The tapered portions 91d1 and 91d2 have different shapes. Specifically, in the joint 90S2, the two leading-end projections 91b1 and 91b2 of a leading-end coupling portion 91 are asymmetrically shaped, while the two trailing-end projections 92b1 and 92b2 of a trailing-end coupling portion 92 are asymmetrically shaped.

FIG. 7 is a cross-sectional view of the joint 90S2.

As described above, the leading-end projections 91b1 and 91b2 are provided with the tapered portions 91d1 and 91d2, respectively, for smooth insertion of the leading-end projections 91b1 and 91b2 of the joint 90S2 into the respective grooves 41b of the flange 41 when the flange 41 and the joint 90S2 are coupled. One of the tapered portions 91d1 and 91d2 has a longer leading end than the other. For example, as illustrated in FIGS. 6 and 7, the tapered portion 91d1 has a longer leading end than the tapered portion 91d2. Accordingly, even if the leading-end projections 91b1 and 91b2 of the joint 90S2 and the grooves 41b of the flange 41 are positioned at unintended angles due to processing errors, the tapered portions 91d1 and 91d2 guide the respective leading-end projections 91b1 and 91b2 such that the leading-end projections 91b1 and 91b2 are smoothly inserted into the respective grooves 41b.

Also as described above, the leading-end coupling portion 91 and the trailing-end coupling portion 92 of the joint 90S2 include the two asymmetrical leading-end projections 91b1 and 91b2 and the two asymmetrical trailing-end projections 92b1 and 92b2, respectively. Accordingly, the second gear 82, the joint 90S2 and the flange 41 are assembled with their eccentricity components phase-matched and offset. A description is now given of four examples of such asymmetrically shaped projections of the leading-end coupling portion 91 and the trailing-end coupling portion 92. As a first example, all except one of the plurality of projections have identical radii. As a second example, all except one of the plurality of projections have identical heights. As a third example, the plurality of projections are positioned at different angles. Specifically, for example, three projections are positioned unequally, not at an angle of 120 degrees, in a circumferential direction. As a fourth example, other than a projection for drive coupling, a corrugated portion is provided for phase matching. It is to be noted that the shapes, numbers, positional angles and the like of the grooves 41b of the flange 41 and the grooves 82b of the second gear 82 may be determined in accordance with such examples of the asymmetrically shaped projections of the leading-end coupling portion 91 and the trailing-end coupling portion 92.

If a joint is relatively long in an axis of the joint while having a relatively small radius, the joint might have a relatively low torsional rigidity. Instant load torque fluctuation upon image transfer on a recording medium might twist the joint and degrade rotational accuracy, thereby causing a shock jitter. Additionally, such a low torsional rigidity leads a low torsional natural frequency, which might cause sympathetic vibration with gear meshing, resulting in the rotational irregularity. To increase the torsional rigidity of the joint and avoid sympathetic vibration, the radius of the joint may be increased from the leading-end coupling portion toward the trailing-end coupling portion. However, such a configuration may require enlargement of a flange for a photoconductor, and enlargement of the photoconductor. To avoid such a structural enlargement, in the present embodiment, the joint 90 includes the truncated cone portion 93 between the leading-end coupling portion 91 and the trailing-end coupling portion 92 in the axial direction Z. As described above, the truncated cone portion 93 includes the circumferential surface 93a inclined with respect to the axial direction Z. Such a configuration increases the torsional rigidity of the joint 90 while avoiding sympathetic vibration. The torsional rigidity of the joint 90 can be increased using resin, instead of metal, as a material of the joint 90, allowing weight and resource saving of the joint 90.

Figure 8:
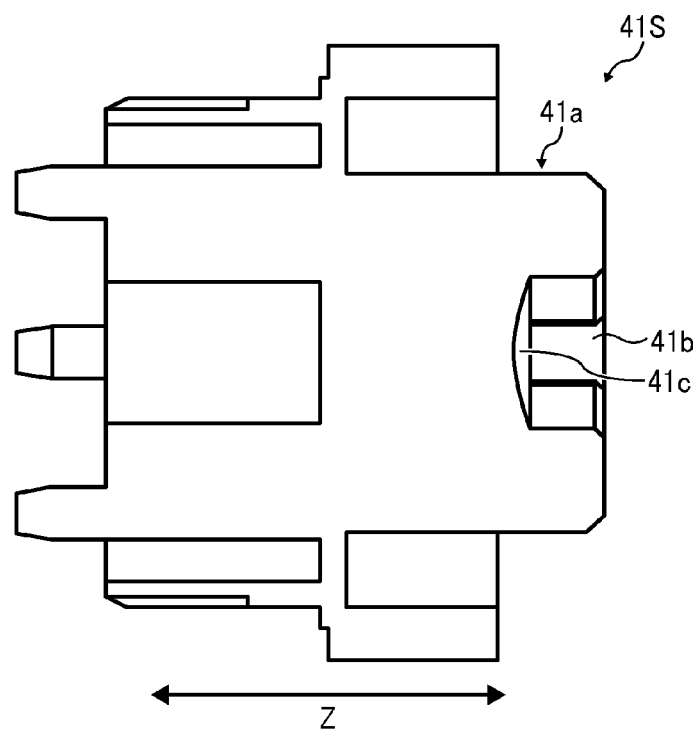
FIG. 8 is a cross-sectional view of a variation of the flange of FIG. 4A.

Referring now to FIG. 8, a description is given of a variation of the flange 41. FIG. 8 is a cross-sectional view of a flange 41S as a variation of the flange 41.

As illustrated in FIG. 8, the flange 41S includes a spherical contact portion 41c. The spherical contact portion 41c of the flange 41S minimizes the rotational irregularity even if the spherical leading-end face 91c of the joint 90S2 has burrs from the mold. It is to be noted that a radius of the spherical contact portion 41c of the flange 41S is not necessarily equal to a radius of the spherical leading-end face 91c of the joint 90S2. The radius of the spherical contact portion 41c of the flange 41S may be larger than the radius of the spherical leading-end face 91c of the joint 90S2.

If a joint has a flat leading-end face, the flat leading-end face might contact the contact portion of the flange with its edge, not its flat face, when the joint is inclined with respect to the axial direction Z due to deviation of axis and/or angle. In such a case, a reaction force from the flange to the joint might be stronger than a reaction force generated when the flat leading-end face of the joint contacts the contact portion of the flange with its flat face. Such a stronger reaction force allows the joint to press a compression coil spring harder and changes the load of the compression coil spring. As a consequence, the rotational irregularity might occur due to the fluctuation of a force from the spring in a direction in which a thrust is generated.

FIG. 9A is a cross-sectional view of the drive transmission device 70, illustrating the flange 41 and the second gear 82 coaxially positioned on a common axial center XY while being coupled by the joint 90 having the spherical leading-end face 91c. FIG. 9B is a cross-sectional view of the drive transmission device 70, illustrating an axial center Y of the flange 41 and an axial center X of the second gear 82 misaligned while the flange 41 and the second gear 82 are coupled by the joint 90 having the spherical leading-end face 91c.

It is to be noted that the drive transmission device 70 described below includes the joint 90 having the spherical leading-end face 91c. The spherical leading-end face 91c contacts the contact portion 41c of the flange 41 with its spherical face, even if the joint 90 is inclined with respect to the axial direction Z due to deviation of axis and/or angle, thereby restraining the fluctuation of the reaction force from the flange 41 to the joint 90 pressed toward the flange 41 by the compression coil spring 73, and further restraining the change in the load of the compression coil spring 73. Accordingly, even upon deviation of axis and/or angle, the drive transmission device 70 according to the present embodiment minimizes the rotational irregularity attributed to the fluctuation of a force from a spring in a direction in which a thrust is generated. In this manner, the rotational irregularity of the photoconductor 40 is minimized. As a consequence, an image is reliably formed without causing a banding or uneven density.

It is to be noted that if a leading-end face of a joint has a simple spherical shape, for example, if the leading-end face has a spherical shape being a part of a circumferential surface of a leading-end coupling portion, the joint might be axially elongated compared to a joint having a flat leading-end face, hampering downsizing of the whole apparatus. Whereas, in the present embodiment, the radius of the spherical leading-end face 91c is larger than a radius of the spherical circumferential surface 91a. Thus, the joint 90 is axially shorter than the comparative joint in which the radius of the leading-end face is equal to the radius of the circumferential surface, i.e., the circumferential surface and the leading-end face integrally form a spherical shape. Accordingly, the image forming apparatus 1000 is downsized.

It is to be noted that the larger the radius of the leading-end face 91c is, the smaller the gradient of a trailing end of the joint 90 with respect to the axial direction Z is, when the joint 90 is inclined with respect to the axial direction Z while the leading-end face 91c of the joint 90 is in contact with the contact portion 41c of the flange 41. In the present embodiment, the radius of the leading-end face 91c is larger than the radius of the circumferential surface 91a, thereby decreasing the positional fluctuation of the trailing end of the joint 90 in the axial direction Z, compared to a case in which the radius of the leading-end face 91c is the same as the radius of the circumferential surface 91a. Accordingly, in the present embodiment, the load fluctuation of the compression coil spring 73 that presses the trailing end of the joint 90 is reduced, and thus, the drive transmission device 70 reliably minimizes the rotational irregularity attributed to the fluctuation of a force from a spring in a direction in which a thrust is generated.

Referring now to FIGS. 10 through 18B, a description is given of a drive transmission device 70T according to a second embodiment of this disclosure. Since the basic configuration of the drive transmission device 70T according to the second embodiment is substantially identical to the configuration of the drive transmission device 70 according to the first embodiment, a detailed description thereof is herein omitted.

Figure 10:
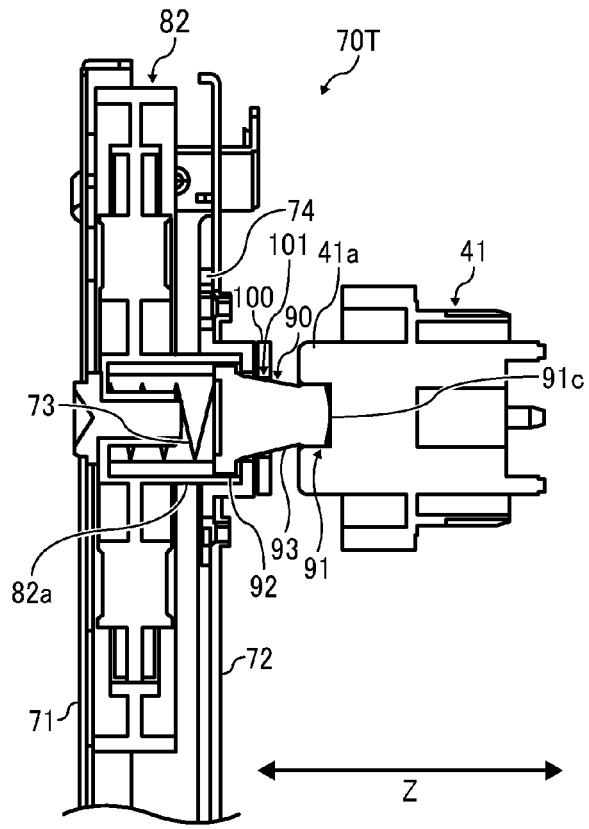
FIG. 10 is a cross-sectional view of a drive transmission device according to a second embodiment.
Figure 11:
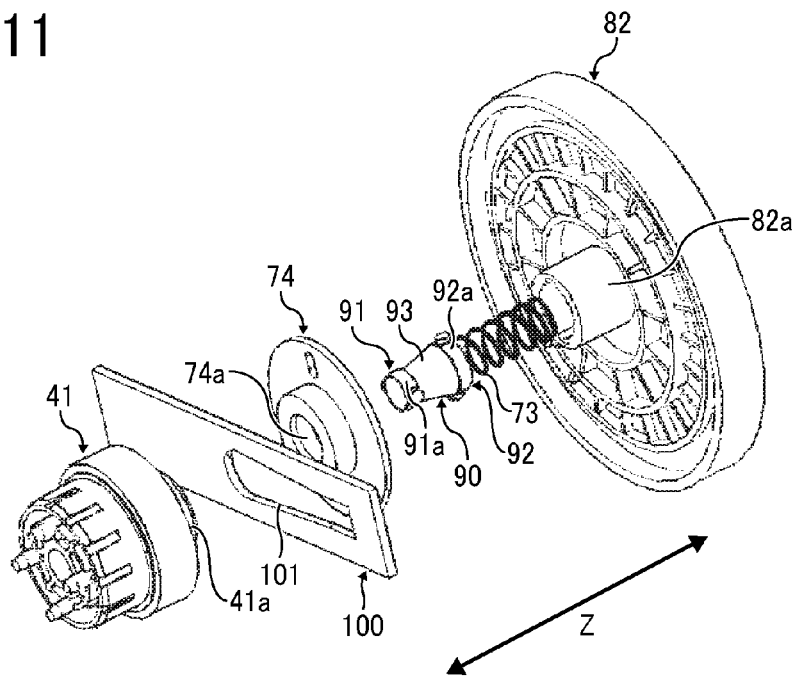
FIG. 11 is an exploded view of the drive transmission device of FIG. 10.

FIG. 10 is a cross-sectional view of the drive transmission device 70T. FIG. 11 is an exploded view of the drive transmission device 70T.

A second gear 82, a joint 90 and a flange 41 are positioned on a common axis. The joint 90 releasably couples the second gear 82 and the flange 41 in an axial direction Z. In the present embodiment, the drive transmission device 70T includes a coupling releaser 100 between the second gear 82 and the flange 41. The coupling releaser 100 has a hole 101 into which the joint 90 is inserted, and releases coupling of, or separates the joint 90 and the flange 41. A compression coil spring 73 is disposed between the second gear 82 and the joint 90 in the axial direction Z. The compression coil spring 73 presses the joint 90 so that the joint 90 contacts the flange 41. The second gear 82 includes a coupled portion 82a. The coupled portion 82a has a gap inside to receive the joint 90 axially moving toward the second gear 82 from a coupling position where the joint 90 is coupled with the flange 41. Thus, the joint 90 moves axially toward the second gear 82 to separate the joint 90 and the flange 41. With such a configuration, a photoconductor 40 is removable in a direction perpendicular to a rotational shaft of the photoconductor 40 as the flange 41 is disposed on one end of the rotational shaft of the photoconductor 40.

Figure 12:
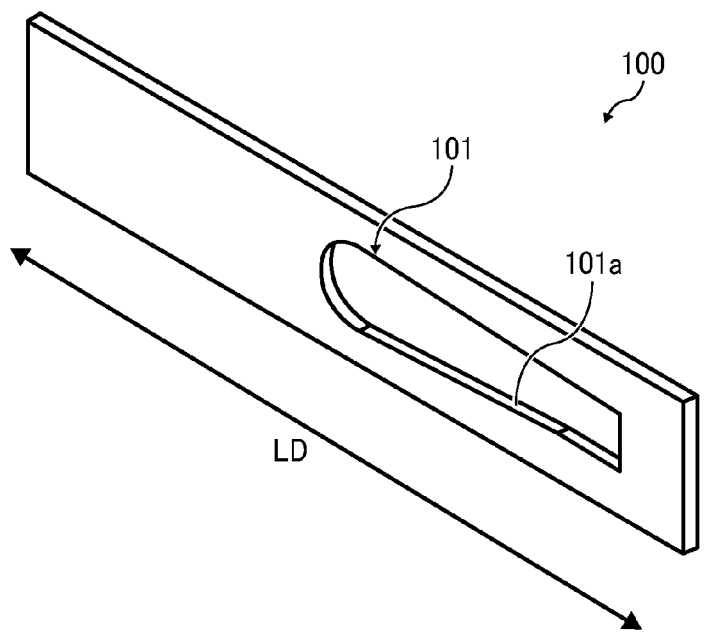
FIG. 12 is a perspective view of a coupling releaser incorporated in the drive transmission device of FIG. 10.

FIG. 12 is a perspective view of the coupling releaser 100.

As illustrated in FIG. 12, the coupling releaser 100 is a thin board having the hole 101 into which the joint 90 is inserted. The hole 101 is elongated in a longitudinal direction LD. A width of the hole 101 gradually changes in the longitudinal direction LD.

A typical coupling releaser increases a drive transmission device in size because, for example, a releasing mechanism needs a sloped portion, and a coupling presser or a coupling needs a guard on an outer circumference of the coupling presser or the coupling. Whereas, use of the coupling releaser 100 according to the present embodiment obviates the need to provide such a great inclination as in the typical coupling releaser, thereby being downsized. Additionally, a coupling and a drive transmission device are downsized by rendering a guard unnecessary on the outer circumference of the coupling presser or the coupling. Thus, in the present embodiment, coupling and separation are conducted space-efficiently in the downsized drive transmission device 70T and the image forming apparatus 1000.

For coupling and separation, the coupling releaser 100 is slidable in a direction perpendicular to the axial direction Z of the joint 90. The coupling releaser 100 may be manually and directly slid, or preferably, using e.g., a link mechanism, the coupling releaser 100 may be slid in conjunction with opening and closing operations of the front cover of the image forming apparatus 1000, which covers the drive transmission device 70T, the toner image forming stations 18 and the like. In such a case, unit replacement procedures are simplified, thereby enhancing the work efficiency.

With regard to the shape of the joint 90, a radius of a spherical circumferential surface 91a of a leading-end coupling portion 91 is smaller than a radius of a spherical circumferential surface 92a of a trailing-end coupling portion 92. Such a configuration allows a holder 74 to be attached to the joint 90 from the front side of the joint 90 to regulate movement of the second gear 82 and the joint 90 in the axial direction Z, which is a direction in which a thrust is generated. In other words, the holder 74 is attached to the joint 90 fit in the second gear 82, thereby enhancing assembly. Whereas, a holder cannot be attached to a joint fit in a second gear if a radius of a circumferential surface of a leading-end coupling portion of the joint is equal to a radius of a circumferential surface of a trailing-end coupling portion of the joint, in other words, if the respective circumferential surfaces of the leading-end coupling portion and the trailing-end coupling portion of the joint have the same spherical shape.

Figure 13:
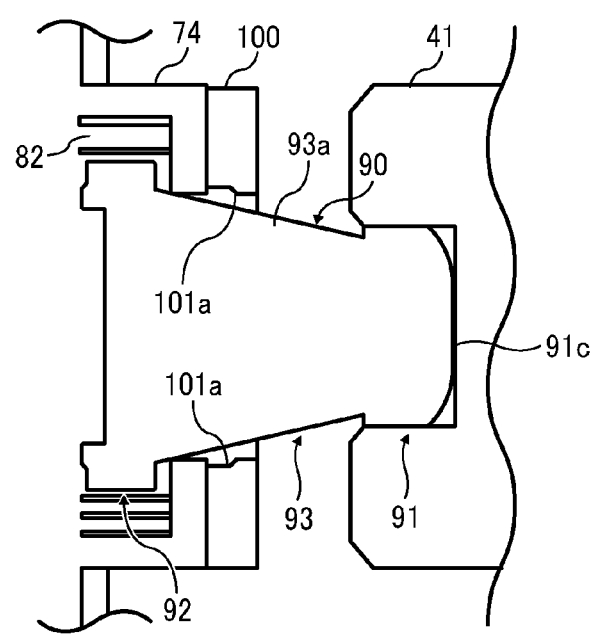
FIG. 13 is a schematic view of the coupling releaser and surrounding components, particularly illustrating a hole of the coupling releaser having an inner wall with a gradient.

FIG. 13 is a schematic view of the coupling releaser 100 and surrounding components, particularly illustrating the hole 101 of the coupling releaser 100 having an inner wall 101a with a gradient.

Preferably, as illustrated in FIG. 13, the inner wall 101a has a gradient equal to or substantially equal to a circumferential surface 93a of a truncated cone portion 93 of the joint 90. In such a configuration, the inner wall 101a of the coupling releaser 100 and the circumferential surface 93a of the joint 90 contact each other with their surfaces, thereby stabilizing a necessary releasing force and enhancing a releasing operation.

Figure 14:
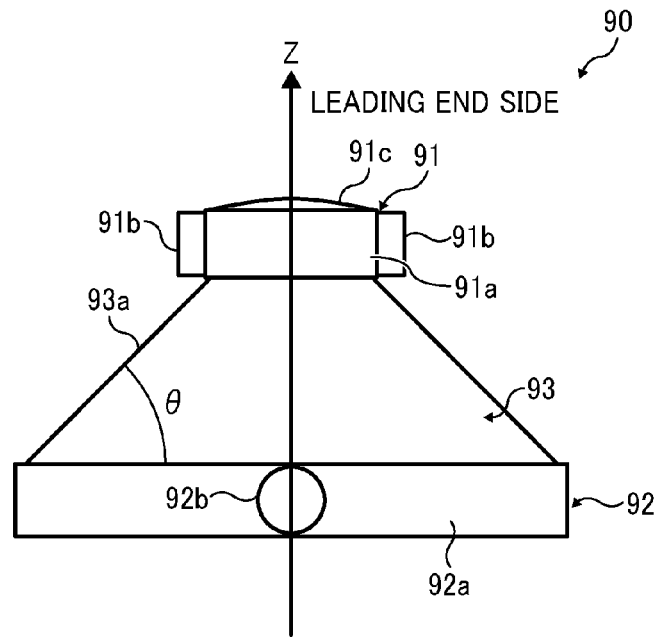
FIG. 14 is a cross-sectional view of a joint incorporated in the drive transmission device according to the second embodiment, specifically illustrating a gradient of a circumferential surface of a truncated cone portion.

FIG. 14 is a cross-sectional view of the joint 90, specifically illustrating a gradient of the circumferential surface 93a of the truncated cone portion 93.

The circumferential surface 93a is inclined at an angle θ, preferably at an angle of 45 degrees or less at a bottom of the truncated cone portion 93, with respect to the direction perpendicular to the axial direction Z. When the coupling releaser 100 moves the joint 90 toward the second gear 82, the circumferential surface 93a of the truncated cone portion 93 of the joint 90 receives a vertical force from the coupling releaser 100. Specifically, a larger force is applied in a direction in which the joint 90 moves when the circumferential surface 93a of the truncated cone portion 93 of the joint 90 is inclined at a smaller angle θ. Therefore, moving the joint 90 requires a smaller force, resulting in an increased durability of the joint 90.

Figure 15A:
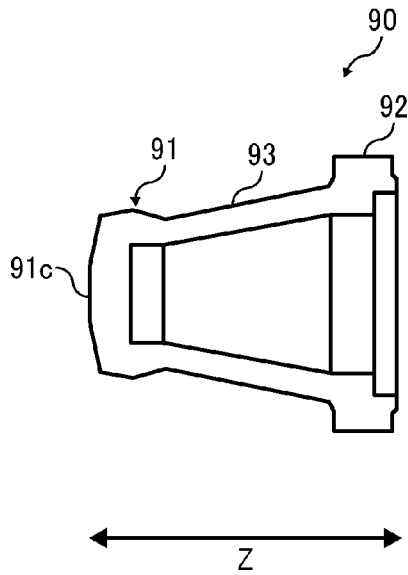
FIG. 15A is a cross-sectional view of the joint hollowed out.
Figure 15B:
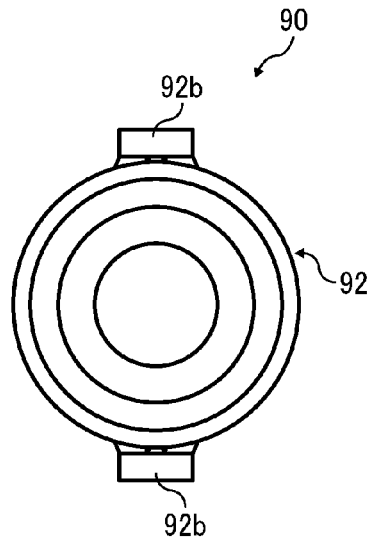
FIG. 15B is a schematic view of the joint of FIG. 15A from a trailing end side.

FIG. 15A is a cross-sectional view of the joint 90 hollowed out. FIG. 15B is a schematic view of the joint 90 of FIG. 15A from a trailing end side.

As illustrated in FIGS. 15A and 15B, the joint 90 is hollowed out and has a uniform thickness to enhance moldability of the joint 90. Additionally, the joint 90 reduces material and production costs by having a cavity inside. The material of the joint 90 includes resin with a high rigidity such as polyacetal or polyoxymethylene (POM) reinforced by carbon fibers or glass fibers. A natural frequency F of torsional vibration satisfies the following expression.

$$F \propto \sqrt{G} \quad (1)$$

G: Young's modulus (flexural modulus)

Use of such a high-rigidity resin, i.e., resin with a high Young's modulus G, changes the natural frequency F of torsional vibration. Accordingly, as reinforced against torsion, the joint 90 made of high-rigidity resin minimizes the rotational irregularity upon sympathetic vibration of gear meshing and torsional vibration.

Figure 16:
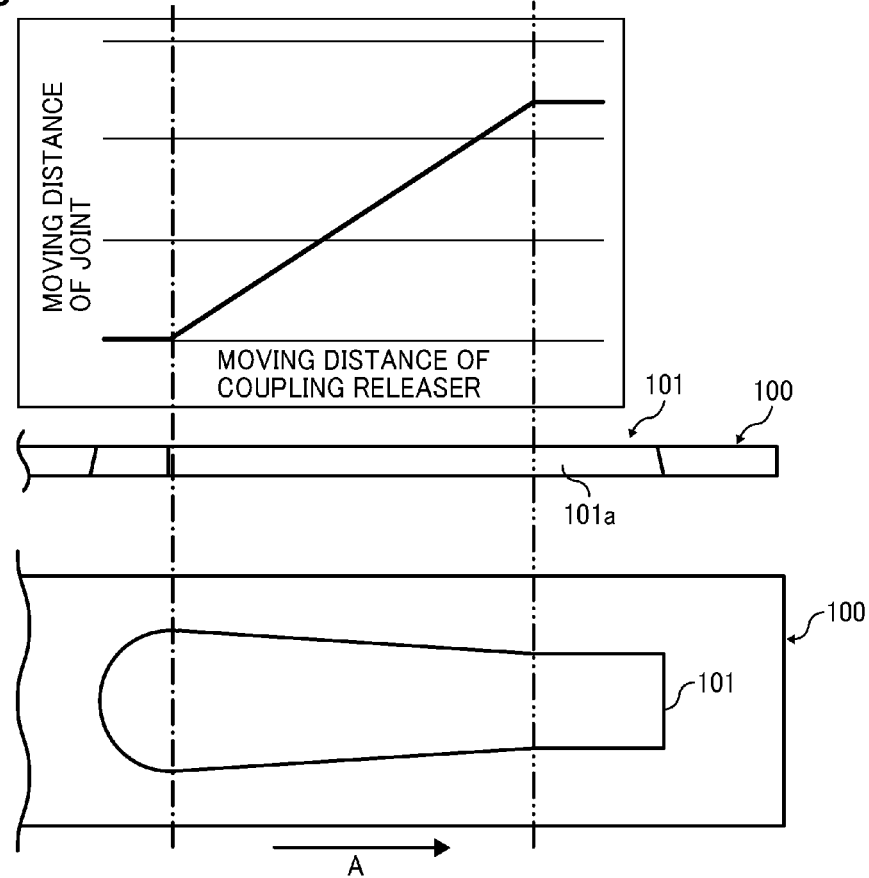
FIG. 16 is a graph illustrating a relationship between a moving distance of the coupling releaser and a moving distance of the joint while illustrating a coupling position and a releasing position of the coupling releaser.
Figure 17A:
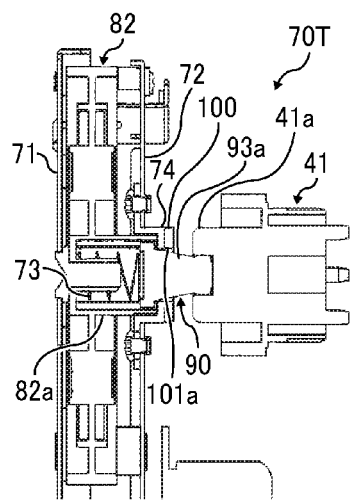
FIG. 17A is a cross-sectional view of the drive transmission device including the joint at a coupling position.
Figure 17B:
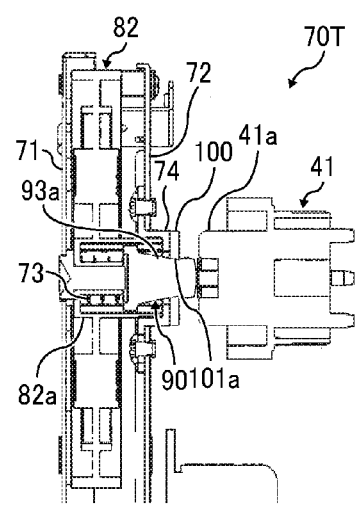
FIG. 17B is a cross-sectional view of the drive transmission device including the joint at a releasing position.
Figure 18B:
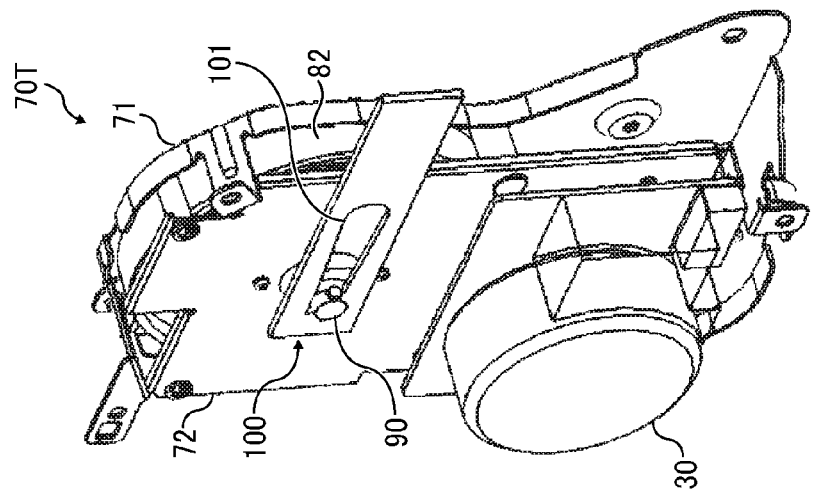
FIG. 18B is a perspective view of the drive transmission device of FIG. 17B.
Figure 18A:
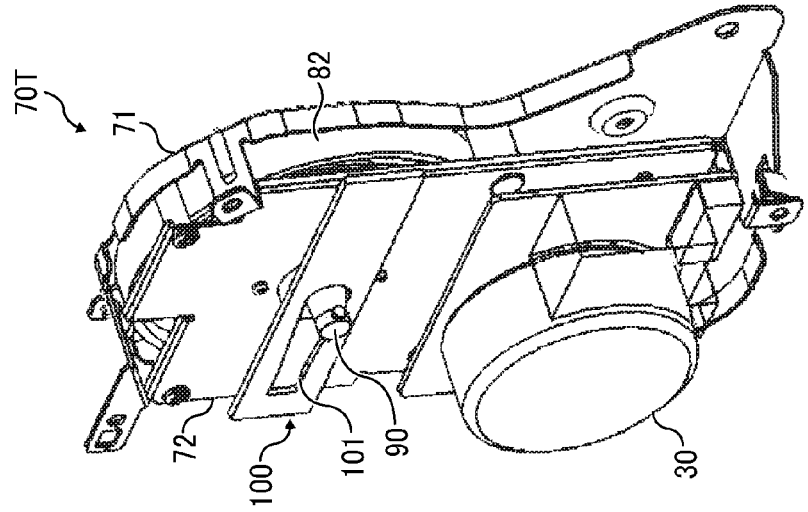
FIG. 18A is a perspective view of the drive transmission device of FIG. 17A.

FIG. 16 is a graph of a relationship between a moving distance of the coupling releaser 100 and a moving distance of the joint 90 while illustrating a coupling position and a releasing position of the coupling releaser 100. FIG. 17A is a cross-sectional view of the drive transmission device 70T including the joint 90 at a coupling position. FIG. 17B is a cross-sectional view of the drive transmission device 70T including the joint 90 at a releasing position. FIG. 18A is a perspective view of the drive transmission device 70T including the joint 90 at the coupling position. FIG. 18B is a perspective view of the drive transmission device 70T including the joint 90 at the releasing position.

Referring to FIG. 18A, when the joint 90 is positioned at the coupling position indicated by a one-dot chain line in FIG. 16, in the hole 101 of the coupling releaser 100, the coupling releaser 100 is not in contact with the joint 90. In such a state, the joint 90 is coupled to the flange 41 as illustrated in FIG. 17A. Referring to FIG. 18B, when the joint 90 is positioned at the releasing position indicated by a two-dot chain line in FIG. 16, in the hole 101 of the coupling releaser 100, the coupling releaser 100 is in contact with the joint 90. In such a state, the joint 90 and the flange 41 are separated from each other as illustrated in FIG. 17B. As illustrated in FIG. 16, the hole 101 of the coupling releaser 100 is reduced in width from the coupling position toward the releasing position in the longitudinal direction LD of the coupling releaser 100.

To separate the joint 90 from the flange 41, the coupling releaser 100 is slid in a direction indicated by arrow A in FIG. 16 such that the joint 90 moves from the coupling position to the releasing position in the hole 101 of the coupling releaser 100. Then, the circumferential surface 93a of the truncated cone portion 93 of the joint 90 contacts the inner wall 101a of the hole 101 of the coupling releaser 100, and the coupling releaser 100 presses the joint 90 toward the second gear 82 axially along the joint 90. Sliding the coupling releaser 100 moves the joint 90 toward the second gear 82 against a force from a compression coil spring 73 in the relationship between the moving distance of the coupling releaser 100 and the moving distance of the joint 90 as illustrated in FIG. 16. When the joint 90 reaches the releasing position in the hole 101 of the coupling releaser 100, the joint 90 is separated from the flange 41 as illustrated in FIG. 17B.

By contrast, to couple the joint 90 with the flange 41, the coupling releaser 100 is slid in a direction opposite the direction indicated by arrow A in FIG. 16 such that the joint 90 moves from the releasing position to the coupling position in the hole 101 of the coupling releaser 100. The force from the compression coil spring 73 moves the joint 90 toward the flange 41 in the relationship between the moving distance of the coupling releaser 100 and the moving distance of the joint 90 as illustrated in FIG. 16. When the joint 90 reaches the releasing position in the hole 101 of the coupling releaser 100, the circumferential surface 93a of the truncated cone portion 93 of the joint 90 is not in contact with the inner wall 101a of the hole 101 of the coupling releaser 100. Thus, the joint 90 is coupled to the flange 41.

It is to be noted that, in the present embodiment, the moving distance of the coupling releaser 100 and the moving distance of the joint 90 are in a proportional relation. The movement of the coupling releaser 100 between the coupling position and the releasing position has clearances.

Referring now to FIGS. 19 through 26C, a description is given of a drive transmission device 70U according to a third embodiment of this disclosure. Since the basic configuration of the drive transmission device 70U according to the third embodiment is substantially identical to the configuration of the drive transmission device 70 according to the first embodiment, a detailed description thereof is herein omitted.

Figure 19:
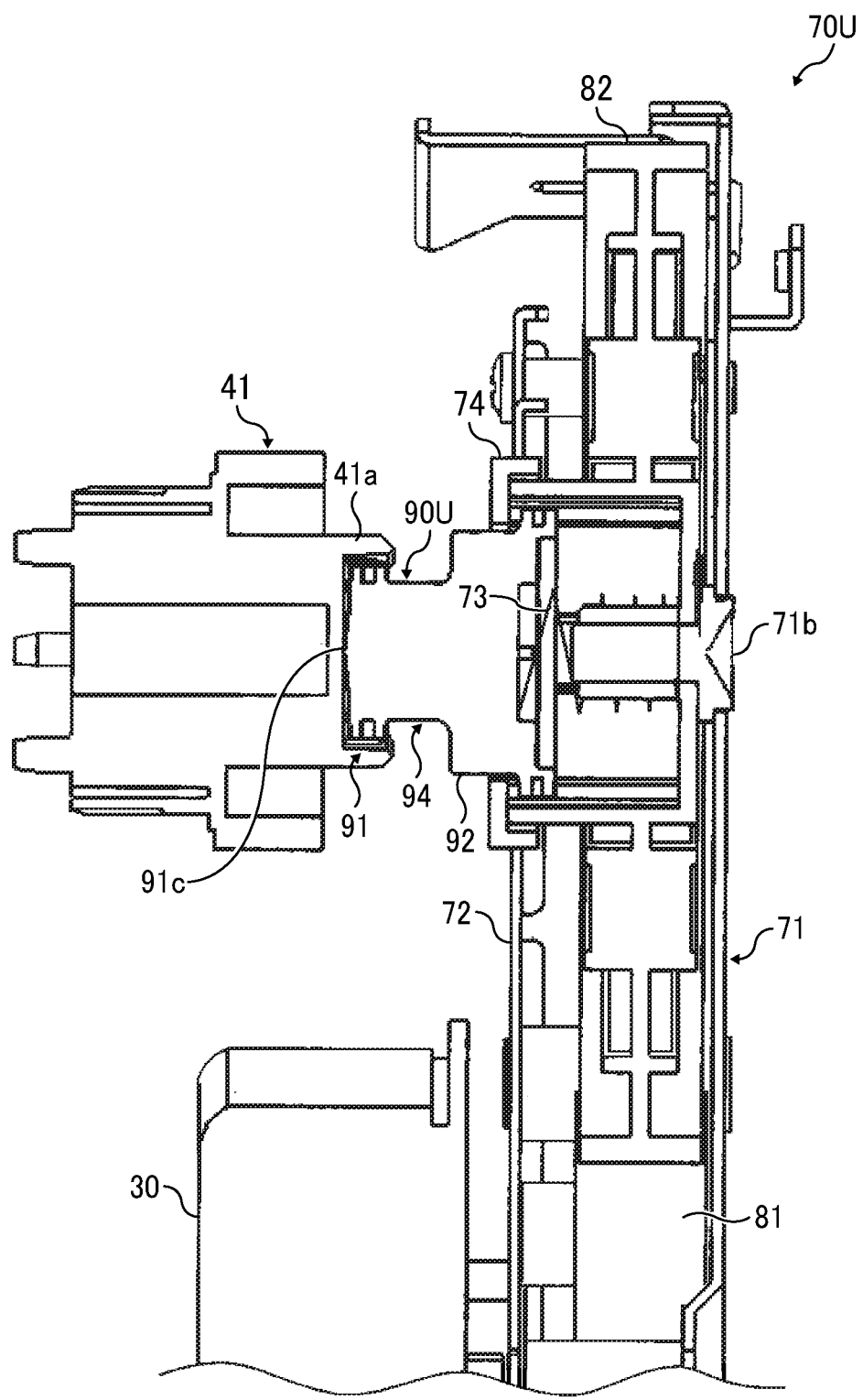
FIG. 19 is a cross-sectional view of a drive transmission device according to a third embodiment.
Figure 20A:
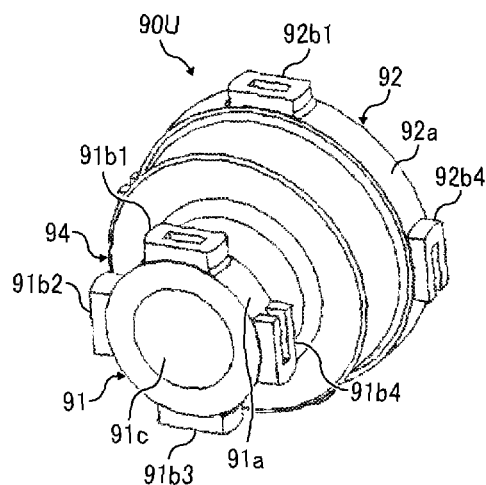
FIG. 20A is a perspective, external view of a joint incorporated in the drive transmission device of FIG. 19.
Figure 20B:
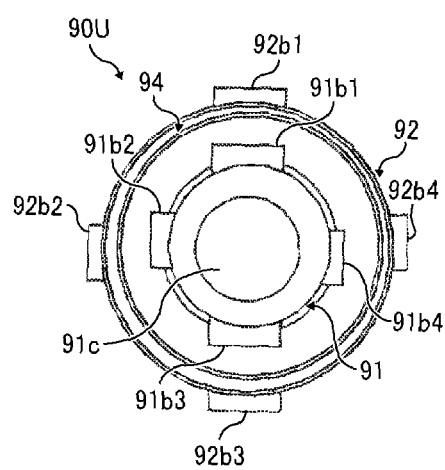
FIG. 20B is an external view of the joint axially from a leading-end side.

FIG. 19 is a cross-sectional view of the drive transmission device 70U. FIG. 20A is a perspective, external view of a joint 90U incorporated in the drive transmission device 70U. FIG. 20B is an external view of the joint 90U incorporated in the drive transmission device 70U axially from a leading-end side.

In the drive transmission device 70U, the joint 90U releasably couples a second gear 82 and a flange 41 in an axis of the joint 90U. The joint 90U includes a leading-end coupling portion 91 and a trailing-end coupling portion 92. The leading-end coupling portion 91 is an end, serving as a second end, of the joint 90U axially facing the flange 41 to be coupled with the flange 41. The trailing-end coupling portion 92 is an end, serving as a first end, of the joint 90U axially facing the second gear 82 to be coupled with the second gear 82. In the present embodiment, the joint 90U includes a double tube 94 between the leading-end coupling portion 91 and the trailing-end coupling portion 92 in the axis of the joint 90U. The double tube 94 includes a first tube next to the leading-end coupling portion 91 and a second tube next to the trailing-end coupling portion 92. A radius of the first tube is smaller than a radius of the second tube. The joint 90U includes a spherical leading-end face 91c, i.e., an end face of the leading-end coupling portion 91. Accordingly, upon deviation of axis or angle between the second gear 82 and the flange 41, the joint 90U is inclined to restrain the rotational irregularity.

As illustrated in FIGS. 20A and 20B, the leading-end coupling portion 91 includes a spherical circumferential surface 91a and four leading-end projections 91b1, 91b2, 91b3 and 91b4 serving as couplers projecting from the spherical circumferential surface 91a at equal intervals in a rotational direction. In the meantime, the trailing-end coupling portion 92 includes a spherical circumferential surface 92a and four trailing-end projections 92b1, 92b2, 92b3 and 92b4 serving as couplers projecting from the spherical circumferential surface 92a at equal intervals in the rotational direction.

Among the four leading-end projections 91b1, 91b2, 91b3 and 91b4, each of the leading-end projections 91b1 and 91b3 has a cross section shaped as a rectangle with rounded corners, i.e., oval, constructed of a pair of planar portions parallel to each other and a pair of arc portions. On the other hand, each of the leading-end projections 91b2 and 91b4 has a cross section shaped as a rectangle with a rounded corner, constructed of a pair of planar portions parallel to each other and an arc portion located upstream in a counterclockwise direction in FIG. 20B. Thus, the outer shape of the leading-end projections 91b2 and 91b4 includes a planar portion instead of the arc portion located downstream in the counterclockwise direction in FIG. 20B of the rectangle with round corners. In other words, each of the leading-end projections 91b1 and 91b3 includes arc portions both upstream and downstream in the rotational direction of the joint 90U whereas each of the leading-end projections 91b2 and 91b4 includes an arc portion only downstream in the rotational direction of the joint 90U. When the leading-end coupling portion 91 of the joint 90U is coupled with a coupled portion 41a of the flange 41, the arc portions of the leading-end projections 91b of the leading-end coupling portion 91 contact walls of grooves 41b of the coupled portion 41a in the rotational direction, thereby enabling drive transmission. On the other hand, the planar portions of the leading-end projections 91b do not contribute to the drive transmission as the planar portions of the leading-end projections 91b do not contact the walls of the grooves 41b in the rotational direction.

Among the four trailing-end projections 92b1, 92b2, 92b3 and 92b4, each of the trailing-end projections 92b1 and 92b3 has a cross section shaped as a rectangle with rounded corners, i.e., oval, constructed of a pair of planar portions parallel to each other and a pair of arc portions. On the other hand, each of the trailing-end projections 92b2 and 92b4 has a cross section shaped as a rectangle with a rounded corner, constructed of a pair of planar portions parallel to each other and an arc portion located upstream in a clockwise direction in FIG. 20B. Thus, the outer shape of the trailing-end projections 92b2 and 92b4 includes a planar portion instead of the arc portion located downstream in the clockwise direction in FIG. 20B of the rectangle with round corners. In other words, each of the leading-end projections 91b1 and 91b3 includes arc portions both upstream and downstream in a rotational direction of the joint 90U whereas each of the leading-end projections 91b2 and 91b4 includes an arc portion only downstream in the rotational direction of the joint 90U. When the trailing-end coupling portion 92 of the joint 90U is coupled with a coupled portion 82a of the second gear 82, the arc portions of the trailing-end projections 92b of the trailing-end coupling portion 92 contact walls of grooves 82b of the coupled portion 82a in the rotational direction, thereby enabling drive transmission. On the other hand, the planar portions of the trailing-end projections 92b do not contribute to the drive transmission as the planar portions of the trailing-end projections 92b do not contact the walls of the grooves 82b in the rotational direction.

In the present embodiment, the joint 90U uses different number of the leading-end projections 91b and the trailing-end projections 92b for different drive transmission, depending on the rotational direction. Specifically, when the joint 90U rotates in a forward direction, i.e., the clockwise direction in FIG. 20B, the four leading-end projections 91b1, 91b2, 91b3 and 91b4 and the two trailing-end projections 92b1 and 92b3 are used for the drive transmission. On the other hand, when the joint 90U rotates in a backward direction, i.e., the counterclockwise direction in FIG. 20B, the two leading-end projections 91b1 and 91b3 and the four trailing-end projections 92b, 92b2, 92b3 and 92b4 are used for the drive transmission. Since the leading-end projections 91b1 and 91b3 as well as the trailing-end projections 92b1 and 92b3 are used for drive transmissions when the joint 90U rotates in the forward direction and also in the backward direction, i.e., regardless of the rotational directions of the joint 90U, each of the leading-end projections 91b1 and 91b3 as well as the trailing-end projections 92b1 and 92b3 has a cross section shaped as a rectangle with rounded corners, rather than circle, to enhance the durability.

To enhance durability, a joint may have three or more leading-end projections and trailing-end projections. However, if such a joint is molded with inexpensive equipment, the leading-end projections and the trailing-end projections might have uneven thickness and degrade the component accuracy of the joint. The component accuracy of the joint may be enhanced by hollowing out the leading-end projections and the trailing-end projections. However, such a configuration might complicate the structure of a mold used for molding the joint and increase the production costs of the joint, the drive transmission device, and the image forming apparatus.

Figure 21:
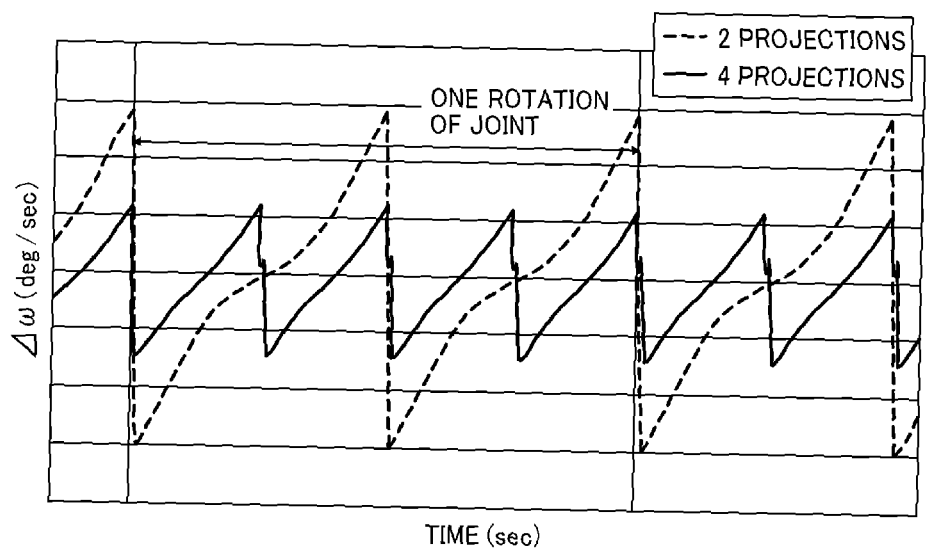
FIG. 21 is a graph illustrating rotational irregularities by the number of projections.

Referring now to FIG. 21, a description is given of rotational irregularities by the number of projections such as the leading-end projections 91b and the trailing-end projections 92b. FIG. 21 is a graph illustrating the rotational irregularities by the number of projections.

It is to be noted that, in FIG. 21, a solid line indicates the rotational irregularity caused when a joint includes four projections whereas a broken line indicates the rotational irregularity caused when a joint includes two projections. The horizontal axis indicates time and the vertical axis indicates deviation from a target angular velocity. As illustrated in FIG. 21, the joint having four projections causes a smaller rotational irregularity and a higher rotational accuracy than the joint having two projections.

Figure 22A:
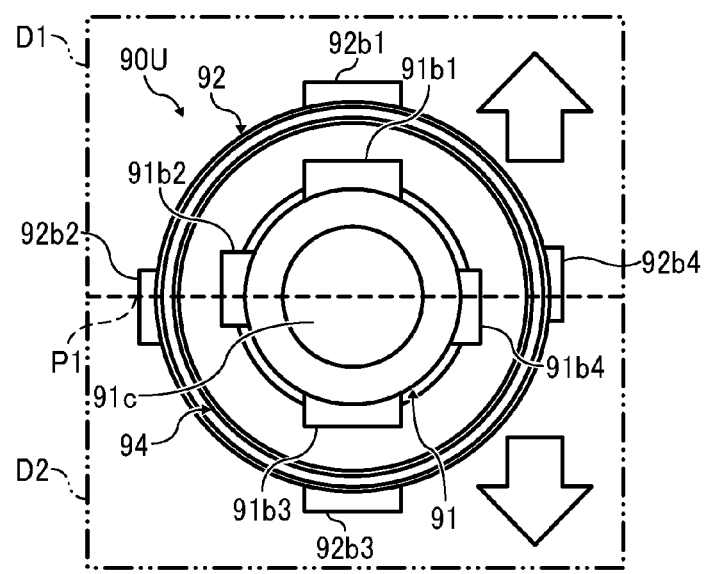
FIG. 22A is a top view of the joint with a mold structure for molding the joint according to the third embodiment.
Figure 22B:
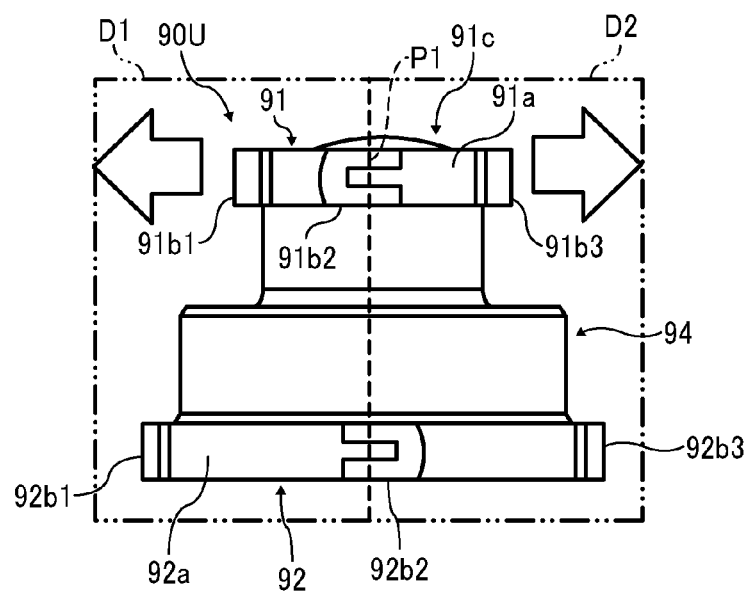
FIG. 22B is a side view of the joint with the mold structure of FIG. 22A.

Referring now to FIGS. 22A and 22B, a description is given of a mold structure for molding the joint 90U according to the present embodiment. FIG. 22A is a top view of the joint 90U with the mold structure. FIG. 22B is a side view of the joint 90U with the mold structure.

As illustrated in FIGS. 22A and 22B, the joint 90U is molded by meeting two molds D1 and D2 so as to form a parting line P1 passing through the leading-end projections 91b2 and 91b4 as well as the trailing-end projections 92b2 and 92b4 in a direction perpendicular to the axis of the joint 90U. To separate the molds D1 and D2, the molds D1 and D2 are moved in directions indicated by arrows in FIGS. 22A and 22B. Couplings used for drive transmission only in one rotational direction, such as the leading-end projections 91b2 and 91b4 as well as the trailing-end projections 92b2 and 92b4 of the joint 90U, allows the leading-end projections 91b and the trailing-end projections 92b to be hollowed out with inexpensive equipment.

If all the four leading-end projections and the four trailing-end projections are hollowed out and used for drive transmission regardless of the rotational directions of the joint, the mold structure might be complicated, increasing the production costs. Such a mold structure might cause failures described below.

Figure 23:
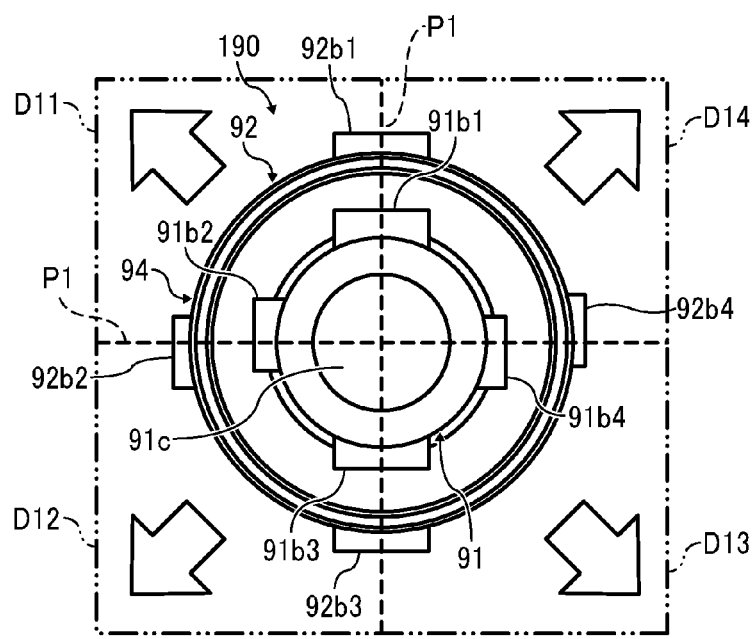
FIG. 23 is a top view of a joint with a mold structure for molding the joint according to a first comparative example.

Referring now to FIG. 23, a description is given of a mold structure for molding a joint 190 according to a first comparative example. FIG. 23 is a top view of the joint 190 with the mold structure.

The joint 190 is molded by meeting four molds D11, D12, D13 and D14 so as to form parting lines P1 and P2 as illustrated in FIG. 23. Specifically, the parting line P1 passes through leading-end projections 91b2 and 91b4 in a direction perpendicular to an axis of the joint 190. The parting line P2 passes through leading-end projections 91b1 and 91b3 in a direction perpendicular to the axis of the joint 190. With the mold structure according to the first comparative example, the projections are unevenly hollowed out, having a relatively thick bottom. Accordingly, the component accuracy decreases.

Figure 24:
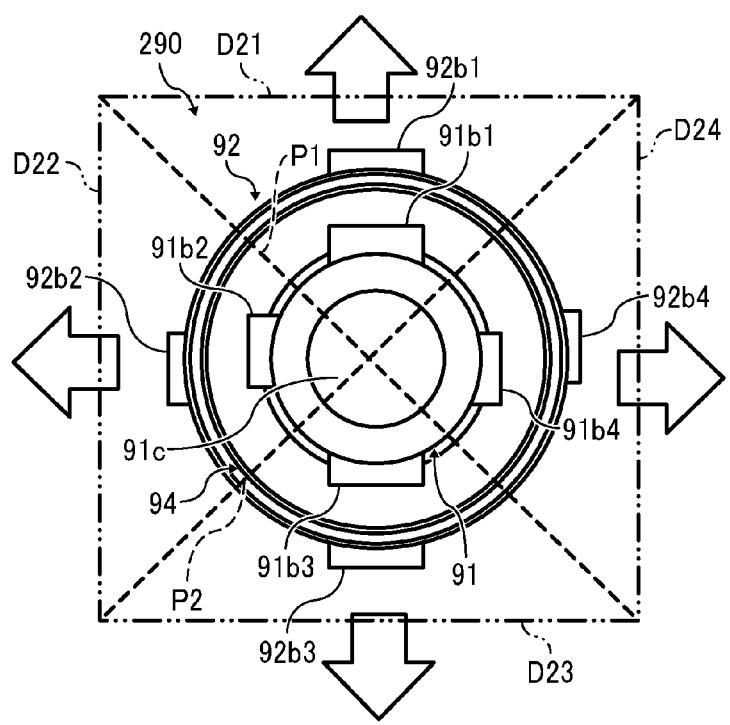
FIG. 24 is a top view of a joint with a mold structure for molding the joint according to a second comparative example.

Referring now to FIG. 24, a description is given of a mold structure for molding a joint 290 according to a second comparative example. FIG. 24 is a top view of the joint 290 with the mold structure.

The joint 290 is molded by meeting four molds D21, D22, D23 and D24 so as to form parting lines P1 and P2 as illustrated in FIG. 24. Specifically, the parting line P1 passes through between leading-end projections 91b1 and 91b2 and between leading-end projections 91b3 and 91b4 in a direction perpendicular to an axis of the joint 290. The parting line P2 passes through between the leading-end projections 91b1 and 91b4 and between leading-end projections 91b2 and 91b3 in a direction perpendicular to the axis of the joint 290. With the mold structure according to the second comparative example, the parting lines P1 and P2 are formed where the joint 290 is coupled with a second gear 82 and a flange 41. Accordingly, the component accuracy decreases.

Figure 25:
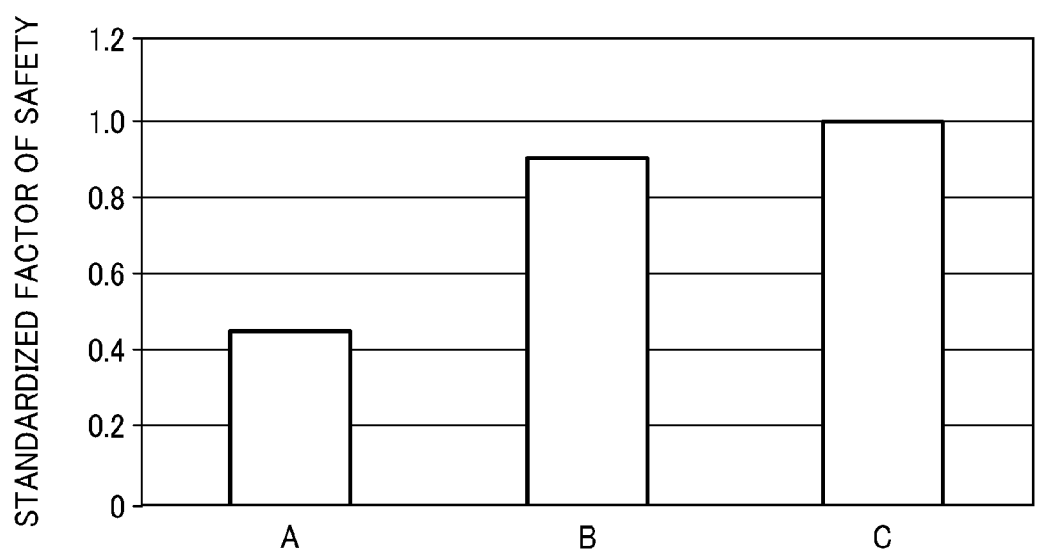
FIG. 25 is a graph illustrating factors of safety assuming an identical load torque for three variations of the joint different from each other only in the number and shape of projections.
Figure 26A:
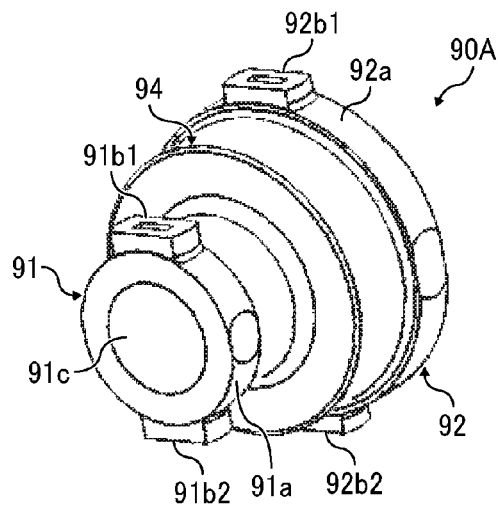
FIG. 26A is a schematic view of a first variation of the joint.
Figure 26B:
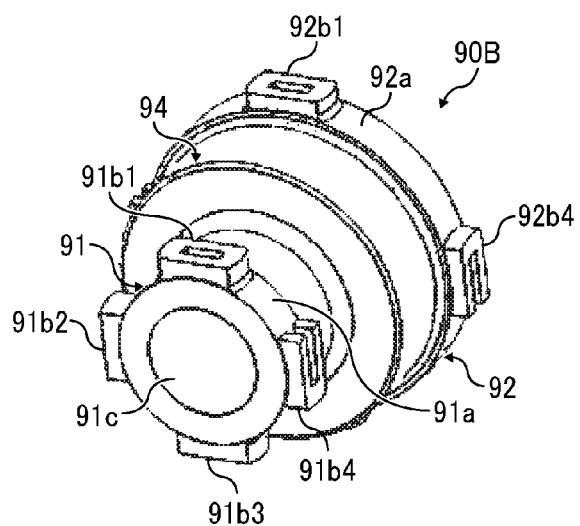
FIG. 26B is a schematic view of a second variation of the joint.
Figure 26C:
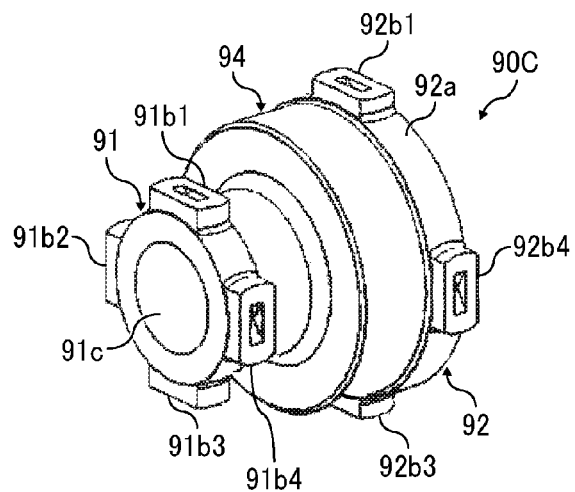
FIG. 26C is a schematic view of a third variation of the joint.

Referring now to FIGS. 25 through 26C, a description is given of variations of the joint 90U. FIG. 25 is a graph illustrating factors of safety assuming an identical load torque for three joints 90A, 90B and 90C different from each other only in the number and shapes of projections such as leading-end projections 91b and trailing-end projections 92b. FIGS. 26A through 26C are schematic views of the joints 90A through 90C, respectively. In FIG. 25, the factor of safety indicated by the vertical axis of FIG. 25 is standardized to the factor of safety of the joint 90C as 1. "A", "B" and "C" indicated along the horizontal axis of FIG. 25 correspond to the joints 90A, 90B and 90C of FIGS. 26A, 26B and 26C, respectively.

As illustrated in FIG. 26A, the joint 90A includes leading-end coupling portion 91 and trailing-end coupling portion 92, each of which includes two projections each having a cross section shaped as a rectangle with rounded corners. Using two molds, which are drawn in directions in which the projections project, the joint 90A is molded such that each of the leading-end coupling portion 91 and the trailing-end coupling portion 92 includes the two projections. The joint 90B of FIG. 26B is equal to the joint 90U of FIG. 19 according to the present embodiment. Similarly to the joint 90A, the joint 90B is molded with inexpensive equipment using two molds. As illustrated in FIG. 26C, the joint 90C includes leading-end coupling portion 91 and trailing-end coupling portion 92, each of which includes four projections each having a cross section shaped as a rectangle with rounded corners. All the projections are used regardless of rotational directions of the joint 90C. Since the joint 90C is molded using four molds as illustrated in FIGS. 23 and 24, the mold structure is complicated and production costs increase compared to the joints 90A and 90B. As illustrated in the graph of FIG. 25, the joint 90B has a slightly lower durability than the joint 90C while having a higher durability than the joint 90A. Thus, the joint 90B or the joint 90U according to the present embodiment decreases the production costs while increasing the durability.

Referring now to FIGS. 27A through 34C, a description is given of a drive transmission device 70V according to a fourth embodiment of this disclosure. Since the basic configuration of the drive transmission device 70V according to the fourth embodiment is substantially identical to the configuration of the drive transmission device 70 according to the first embodiment, a detailed description and a drawing thereof is herein omitted.

Figure 27A:
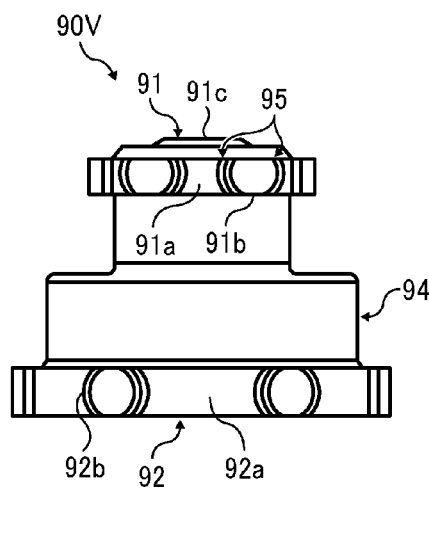
FIG. 27A is an external view of a joint incorporated in a drive transmission device according to a forth embodiment in a direction perpendicular to an axis of the joint.
Figure 27B:
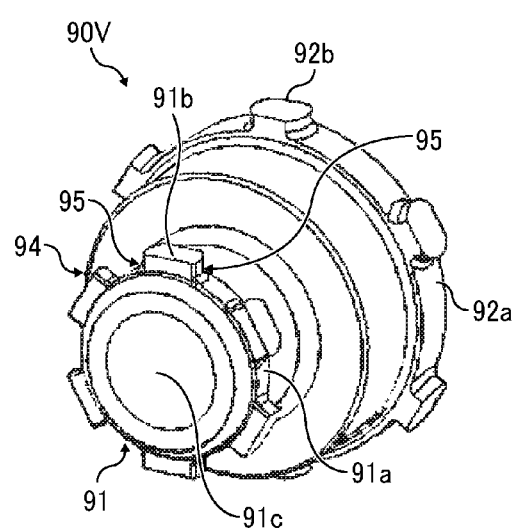
FIG. 27B is a perspective view of the joint of FIG. 27A axially from a flange side.

FIG. 27A is an external view of a joint 90V incorporated in the drive transmission device 70V in a direction perpendicular to an axis of the joint 90V. FIG. 27B is a perspective view of the joint 90V axially from a flange 41V side.

In the present embodiment, the joint 90V includes sloped portions 95, serving as second sloped portions, inclined with respect to the axis of the joint 90V to be coupled with the flange 41V. Specifically, a leading-end projection 91b of the joint 90V is provided with the sloped portions 95 on opposed sides in a rotational direction and on axially closer sides to the flange 41V.

Figure 28A:
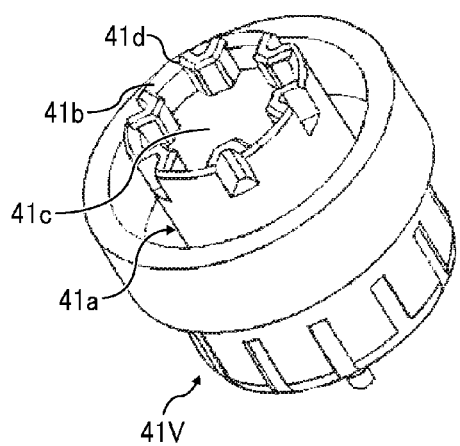
FIG. 28A is a perspective view of the flange incorporated in the drive transmission device according to the forth embodiment, axially from a joint side.
Figure 28B:
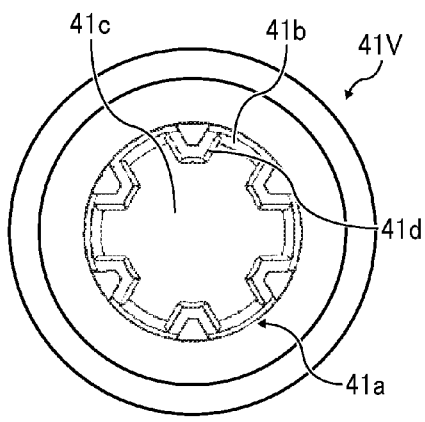
FIG. 28B is an external view of the flange of FIG. 28A axially from the joint side.

FIG. 28A is a perspective view of the flange 41V incorporated in the drive transmission device 70V axially from a joint side. FIG. 28B is an external view of the flange 41V axially from the joint side.

In the present embodiment, the flange 41V includes sloped portions 41d, serving as first sloped portions, inclined with respect to an axis of the flange 41V to be coupled with the joint 90V. Specifically, the flange 41V includes the sloped portions 41d on each edge of a coupled portion 41a and grooves 41b, and also on edges connecting adjacent grooves 41b on an inner circumferential surface of the coupled portion 41a.

Even upon deviation of axis or phase, the sloped portions 41d and sloped portions 95 contacting each other generates a force to move the joint 90V in a direction in which the joint 90V and the flange 41V are coaxially positioned. Consequently, the joint 90V is moved in a direction in which the joint 90V is easily coupled to the flange 41V, resulting in increased robustness to cope with the deviation of axis or phase that may occur when the joint 90V is coupled to the flange 41V.

Figure 29A:
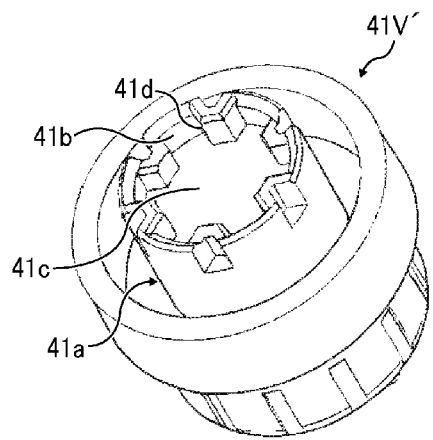
FIG. 29A is a perspective view of a flange having three sloped portions that contact sloped portions of the joint, axially from the joint side.
Figure 29B:
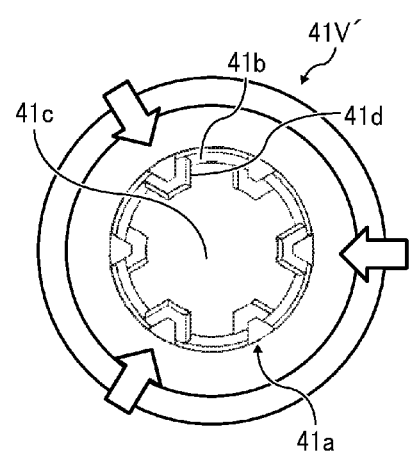
FIG. 29B is an external view of the flange of FIG. 29A axially from the joint side.

FIG. 29A is a perspective view of a flange 41V' having three sloped portions 41d that contact the sloped portions 95, axially from the joint side. FIG. 29B is an external view of the flange 41V' axially from the joint side.

As indicated by arrows in FIG. 29B, the flange 41V' contact the joint 90V with only three of the sloped portions 41d. The three sloped portions 41d are positioned equally at 120 degrees in a rotational direction of the joint 90V, thereby generating a force in a direction in which the flange 41V' is coupled to the joint 90V regardless of a direction of deviation of axis.

Figure 30A:
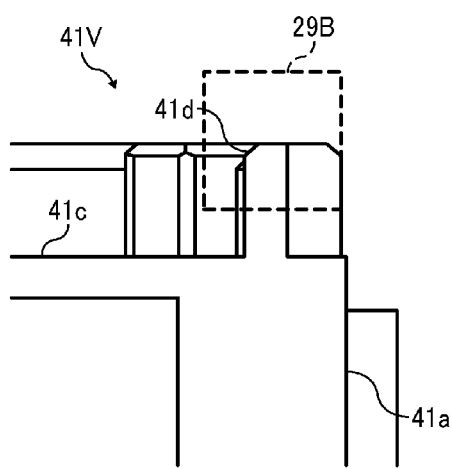
FIG. 30A is a cross-sectional view of the flange, particularly illustrating a sloped portion and its neighboring components.
Figure 30B:
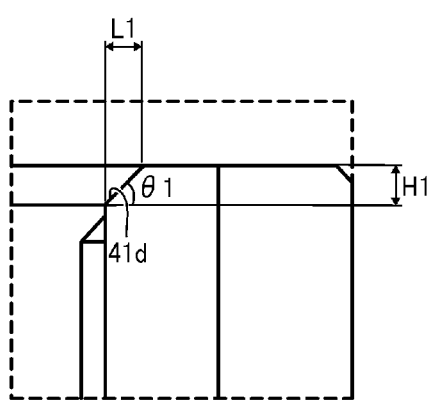
FIG. 30B is an enlarged cross-sectional view of the sloped portion of FIG. 30A.

FIG. 30A is a cross-sectional view of the flange 41V, particularly illustrating one of the sloped portions 41d and its neighboring components. FIG. 30B is an enlarged cross-sectional view of the sloped portion 41d of FIG. 30A.

In the present embodiment, the sloped portion 41d has a height H1 in the axis of the flange 41V and a length L1 in the direction perpendicular to the axis of the flange 41V. The sloped portion 41d is inclined with respect to the direction perpendicular to the axis of the flange 41V at an angle θ1.

Figure 31A:
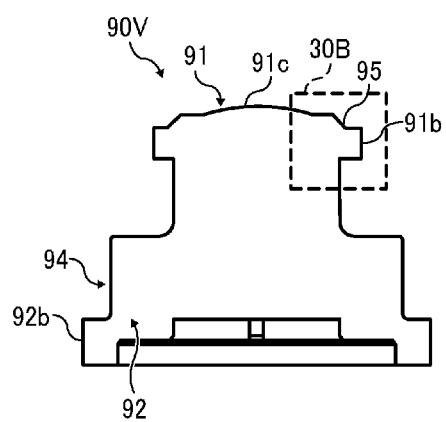
FIG. 31A is a cross-sectional view of the joint.
Figure 31B:
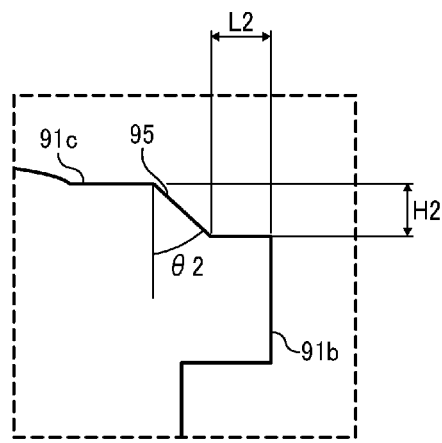
FIG. 31B is an enlarged cross-sectional view of a sloped portion and its neighboring components.

FIG. 31A is a cross-sectional view of the joint 90V. FIG. 31B is an enlarged cross-sectional view of one of the sloped portions 95 and its neighboring components.

In the present embodiment, the sloped portion 95 has a height H2 in the axis of the joint 90V. The leading-end projection 91b has a length L2 in the direction perpendicular to the axis of the joint 90V. The sloped portion 95 is inclined with respect to the direction perpendicular to the axis of the joint 90V at an angle θ2.

Figure 32A:
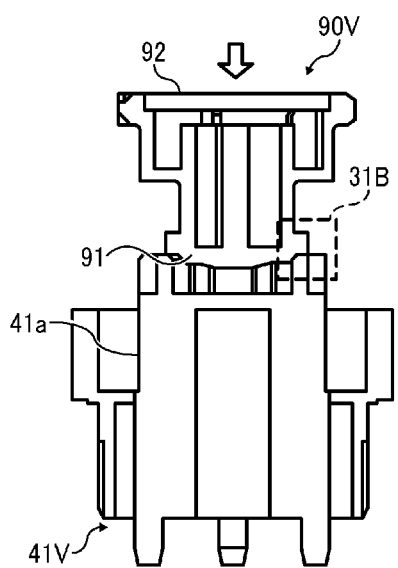
FIG. 32A is a cross-sectional view of the joint and the flange.
Figure 32B:
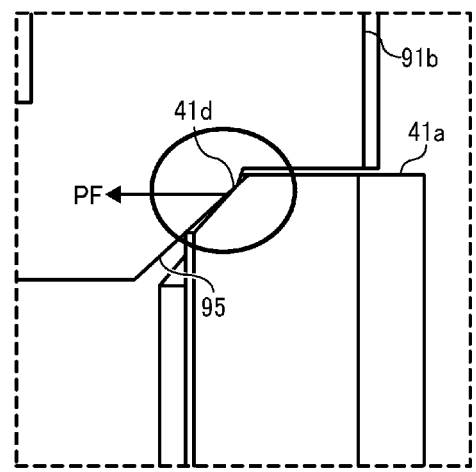
FIG. 32B is an enlarged cross-sectional view of a coupling portion between the joint and the flange of FIG. 32A.

Referring now to FIGS. 32A and 32B, a description is given of how the joint 90V moves upon deviation of axis and/or phase when a relation of H1<H2 and θ1>θ2 is satisfied. FIG. 32A is a cross-sectional view of the joint 90V and the flange 41V. FIG. 32B is an enlarged cross-sectional view of a coupling portion between the joint 90V and the flange 41V. When the joint 90V is moved axially toward the flange 41V and coupled to the flange 41V, the sloped portion 95 of the joint 90V and the sloped portion 41d of the flange 41V contact each other first. Then, the sloped portion 95 receives a force indicated by arrow PF in FIG. 32B from the sloped portion 41d in a direction perpendicular to the axis of the joint 90V and in a direction in which the axis of the joint 90V conforms to the axis of the flange 41V. Consequently, the joint 90V is moved in a direction in which the joint 90V is easily coupled to the flange 41V, resulting in increased robustness in regard to coupling of the joint 90V and the flange 41V.

Figure 33A:
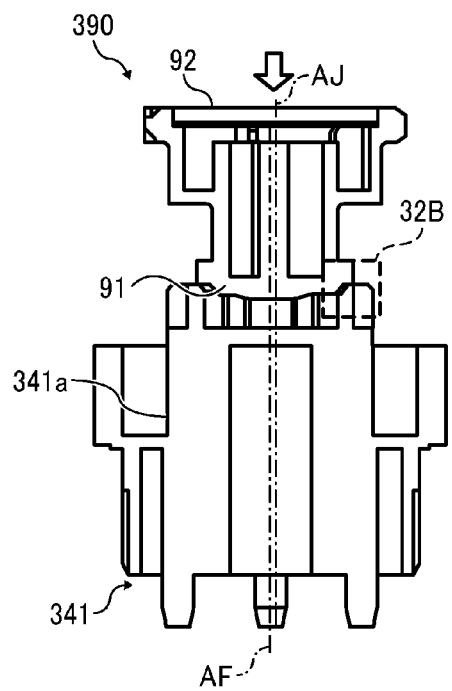
FIG. 33A is a cross-sectional view of a joint and a flange axially aligned according to a comparative example.
Figure 33B:
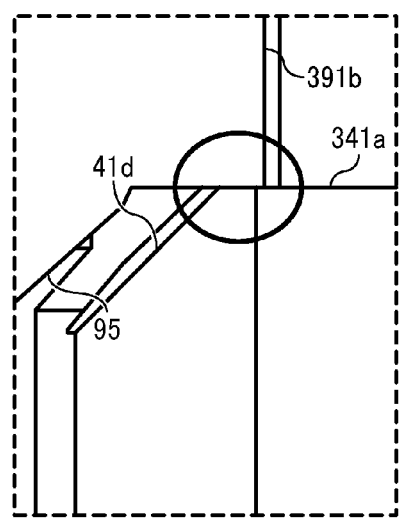
FIG. 33B is an enlarged cross-sectional view of a coupling portion between the joint and the flange of FIG. 33A.
Figure 33C:
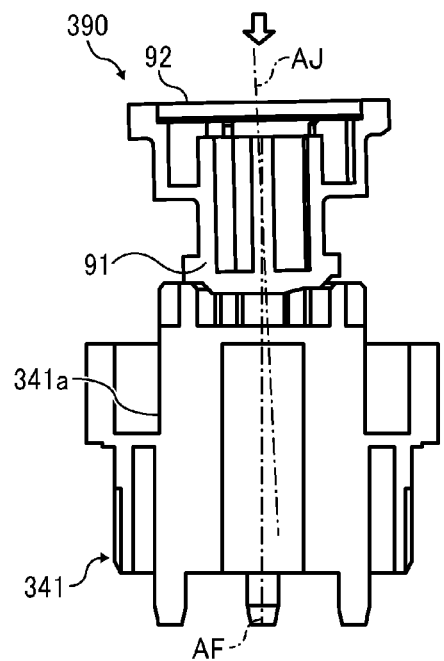
FIG. 33C is a cross-sectional view of the joint and the flange of FIG. 33A axially misaligned.

Referring now to FIGS. 33A through 33C, a description is given of how a joint 390 moves upon deviation of axis and/or phase when a relation of H1>H2 is satisfied according a comparative example. FIG. 33A is a cross-sectional view of the joint 390 and a flange 341, in which an axis AJ of the joint 390 and an axis AF of the flange 341 are aligned. FIG. 33B is an enlarged cross-sectional view of a coupling portion between the joint 390 and the flange 341. FIG. 33C is a cross-sectional view of the joint 390 and the flange 341, in which the axis AJ of the joint 390 and the axis AF of the flange 341 are misaligned.

When the joint 390 is moved axially toward the flange 341 and coupled to the flange 341, ends of a coupled portion 341a and a leading-end face 391b contact each other first as illustrated in FIG. 33B. Then, the joint 390 is inclined with respect to the axis AF of the flange 341 as illustrated in FIG. 33C, as a compression coil spring 73 presses the joint 390 toward the flange 341, hampering the coupling of the joint 390 and the flange 341.

Figure 34A:
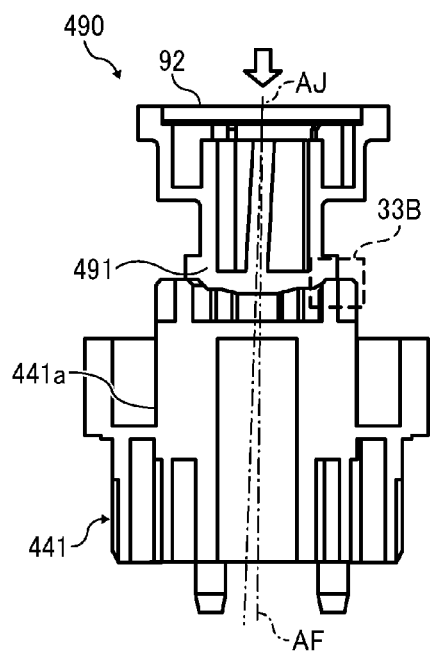
FIG. 34A is a cross-sectional view of a joint and a flange axially misaligned according to another comparative example.
Figure 34B:
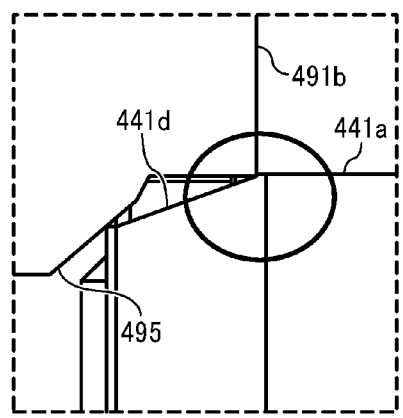
FIG. 34B is an enlarged cross-sectional view of a coupling portion between the joint and the flange of FIG. 34A.
Figure 34C:
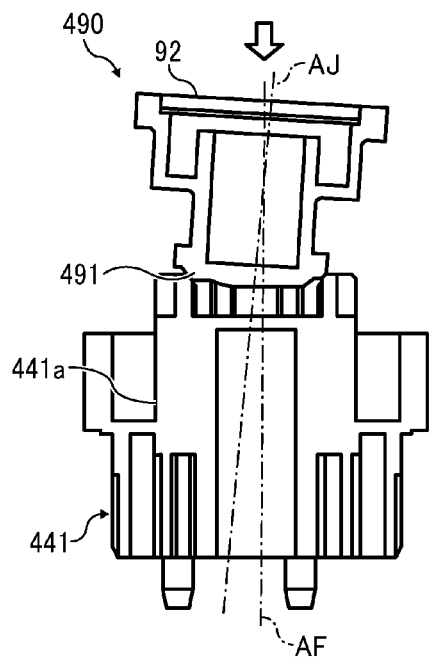
FIG. 34C is a cross-sectional view of the joint and the flange of FIG. 34A, in which the misalignment of the joint and the flange is worsen.

Referring now to FIGS. 34A through 34C, a description is given of how a joint 490 moves upon deviation of axis and/or phase when a relation of L1>L2 is satisfied according another comparative example. FIG. 34A is a cross-sectional view of the joint 490 and a flange 441, in which an axis AJ of the joint 490 and an axis AF of the flange 441 are misaligned. FIG. 34B is an enlarged cross-sectional view of a coupling portion between the joint 490 and the flange 441. FIG. 34C is a cross-sectional view of the joint 490 and the flange 441, in which the misalignment of the axis AJ of the joint 490 and the axis AF of the flange 441 is worsen.

When the joint 490 is moved axially toward the flange 441 and coupled to the flange 441, a sloped portion 495 of the joint 490 and a sloped portion 441d of the flange 441 contact each other first. Then, the joint 490 is moved in a direction in which a leading-end coupling portion 491 of the joint 490 easily fits in a coupled portion 441a of the flange 441. As illustrated in FIG. 34C, the joint 490 is inclined with respect to the axis AF of the flange 441 and a leading-end projection 491b of the joint 490 contacts the sloped portions 441d, thereby receiving a force in a direction which worsens inclination of the joint 490, hampering the coupling of the joint 490 and the flange 441.

Hence, in the present embodiment, a relation of L1<L2 is satisfied to prevent the leading-end projection 91b from contacting the sloped portion 41d, thereby enhancing the coupling, and robustness in regard to coupling, of the joint 90V and the flange 41V.

Although specific embodiments are described, the configurations of image forming apparatus and drive transmission device according to this disclosure are not limited to those specifically described herein. Several aspects of the image forming apparatus and the drive transmission device are exemplified as follows.

Aspect 1.

A drive transmission device (e.g., drive transmission device 70) includes a first rotary body (e.g., second gear 82), a second rotary body (e.g., flange 41), a coupling (e.g., joint 90), and a spring (e.g., compression coil spring 73). The first rotary body is coupled to a drive source, and includes a plurality of grooves (e.g., grooves 82b). The second rotary body receives a drive force transmitted from the drive source, and includes a plurality of grooves (e.g., grooves 41b). The coupling has a first end (e.g., trailing-end coupling portion 92) coupled to the first rotary body and a second end (e.g., leading-end coupling portion 91) axially opposed the first end and coupled to the second rotary body, and couples the first rotary body and the second rotary body. The coupling includes a plurality of couplers (e.g., leading-end projections 91b and trailing-end projections 92b) on a circumferential surface of each of the first end and the second end. The plurality of couplers are axially movable into and out of the plurality of grooves of each of the first rotary body and the second rotary body. The coupling has a spherical end face (e.g., leading-end face 91c) at the second end. The spring presses the coupling toward the second rotary body from the first rotary body.

Accordingly, as described in the above embodiments, even upon deviation of axis and/or angle, the drive transmission device minimizes the rotational irregularity attributed to the fluctuation of a force from a spring in a direction in which a thrust is generated.

Aspect 2.

In Aspect 1, a radius of the spherical end face at the second end of the coupling is larger than a radius of the circumferential surface of the second end of the coupling.

Accordingly, as described in the above embodiments, the drive transmission device and further the image forming apparatus are downsized while even upon deviation of axis and/or angle, the drive transmission device reliably minimizes the rotational irregularity attributed to the fluctuation of a force from a spring in a direction in which a thrust is generated.

Aspect 3.

In Aspect 1 or Aspect 2, the coupling further includes a truncated cone portion (e.g., truncated cone portion 93) between the first end and the second end. The truncated cone portion includes a circumferential surface (e.g., circumferential surface 93a) inclined with respect to an axis of the truncated cone portion, such that a radius of the circumferential surface of the first end of the coupling is larger than the radius of the circumferential surface of the second end of the coupling.

Accordingly, as described in the above embodiments, the torsional rigidity of the coupling is increased, thereby avoiding sympathetic vibration.

Aspect 4.

In any one of Aspect 1 through Aspect 3, all except one of the plurality of couplings have identical radii.

Accordingly, as described in the above embodiments, the plurality of couplers of the coupling are asymmetrically shaped to assemble the first rotary body, the coupling and the second rotary body with their eccentricity components phase-matched and offset.

Aspect 5.

In any one of Aspect 1 through Aspect 3, all except one of the plurality of couplings have identical heights.

Accordingly, as described in the above embodiments, the plurality of couplers of the coupling are asymmetrically shaped to assemble the first rotary body, the coupling and the second rotary body with their eccentricity components phase-matched and offset.

Aspect 6.

In Aspect 1 through Aspect 5, the second rotary body further includes a spherical contact portion (e.g., contact portion 41c) configured to contact the end face at the second end of the coupling.

Accordingly, as described in the above embodiments, the rotational irregularity is minimized even if the coupling has burrs on the spherical end face at the second end.

Aspect 7.

In Aspect 1 or Aspect 3, the drive transmission device further includes a coupling releaser (e.g., coupling releaser 100) having a hole (e.g., hole 101) into which the coupling is inserted, to separate the coupling and the second rotary body. The hole of the coupling release is elongated in a longitudinal direction of the coupling releaser and has an inner wall. When the coupling releaser is moved so that the inner wall of the hole of the coupling releaser contacts a circumferential surface of the coupling, the coupling releaser presses the coupling against a force from the spring and axially moves the coupling toward the first rotary body, thereby releasing the coupling of the coupling and the second rotary body.

Accordingly, as described in the above embodiments, coupling and releasing operations are conducted space-efficiently in the downsized drive transmission device and the image forming apparatus.

Aspect 8.

In Aspect 7, a radius of the circumferential surface of the first end of the coupling is larger than the radius of the circumferential surface of the second end of the coupling.

Accordingly, as described in the above embodiments, the assembly of the drive transmission device is enhanced.

Aspect 9.

In Aspect 7 or Aspect 8, the circumferential surface of each of the first end and the second end of the coupling is spherical.

Accordingly, as described in the above embodiments, the rotational irregularity is minimized.

Aspect 10.

In any one of Aspect 7 through Aspect 9, the inner wall of the hole of the coupling releaser has a gradient equal to or substantially equal to a gradient of the circumferential surface of the truncated cone portion of the coupling.

Accordingly, as described in the above embodiments, the releasing operation is enhanced.

Aspect 11.

In any one of Aspect 7 through Aspect 10, the coupling is hollowed out.

Accordingly, as described in the above embodiments, the moldability of the coupling is enhanced and production costs are reduced.

Aspect 12.

In any one of Aspect 7 through Aspect 11, the coupling is made of a resin material reinforced by carbon fibers or glass fibers.

Accordingly, as described in the above embodiments, the torsional rigidity of the coupling is increased, thereby restraining the rotational irregularity.

Aspect 13.

In any one of Aspect 7 through Aspect 12, the circumferential surface of the truncated cone portion is inclined at an angle of 45 degrees or less with respect to a direction perpendicular to the axis of the truncated cone portion. Accordingly, as described in the above embodiments, a force needed to slide the coupling and the coupling releaser, thereby enhancing the durability.

Aspect 14.

In Aspect 1, different couplers of the plurality of couplers are used for different drive transmission depending on a rotational direction of the coupling.

Accordingly, as described in the above embodiments, the torsional rigidity of the coupling is increased, the production costs are reduced, and the component accuracy is enhanced.

Aspect 15.

In Aspect 14, the plurality of couplers includes four couplers on the circumferential surface of each of the first end and the second end, and wherein the four couplers (e.g., leading-end projections 91b1, 91b2, 91b3 and 91b4) are used for drive transmission in a first rotational direction of the coupling and two of the four couplers (e.g., leading-end projections 91b1 and 91b3) are additionally used for drive transmission in opposite second rotational direction of the coupling opposite the first rotational direction.

Accordingly, as described in the above embodiments, the rotational accuracy and the durability are enhanced.

Aspect 16.

In Aspect 14 or Aspect 15, each of couplers of the plurality of couplers used for drive transmission in both a first rotational direction and a second rotational direction, opposite the first rotational direction, of the coupling has a cross section shaped as a rectangle with rounded corners including a pair of planar portions parallel to each other and a pair of arc portions.

Accordingly, as described in the above embodiments, the durability is enhanced compared to circular couplers.

Aspect 17.

In Aspect 1, the second rotary body further includes a first sloped portion inclined with respect to an axis of the second rotary body and couplable with the coupling. The coupling further includes a second sloped portion inclined with respect to an axis of the coupling and couplable with the second rotary body. When the coupling is axially moved and coupled to the second rotary body, the first sloped portion and the second sloped portion contact each other and the second sloped portion is guided along the first sloped portion so as to move the coupling.

Accordingly, as described in the above embodiments, the robustness is enhanced to cope with the deviation of axis or phase upon coupling of the coupling and the second rotary body.

Aspect 18.

In Aspect 17, a relation of H1<H2 and θ1>θ2 is satisfied, where H1 is a height of the first sloped portion in the axis of the second rotary body, θ1 is an angle at which the first sloped portion is inclined with respect to a direction perpendicular to the axis of the second rotary body, H2 is a height of the second sloped portion in the axis of the coupling, and θ2 is an angle at which the second sloped portion is inclined with respect to a direction perpendicular to the axis of the coupling.

Accordingly, as described in the above embodiments, the robustness is enhanced to cope with the deviation of axis or phase upon coupling of the coupling and the second rotary body.

Aspect 19.

In Aspect 17 or Aspect 18, a relation of L1<L2 is satisfied, where L1 is a length of the first sloped portion in the direction perpendicular to the axis of the second rotary body, and L2 is a length of one of the plurality of couplers of the coupling in the direction perpendicular to the axis of the coupling.

Accordingly, as described in the above embodiments, contact between the one of the plurality of couplers of the coupling and the first sloped portion of the second rotary body are prevented, and the robustness in regard to coupling of the coupling and the second rotary body is enhanced.

Aspect 20.

In Aspect 17, Aspect 18 or Aspect 19, the second rotary body includes at least three first sloped portions that contact the second sloped portions.

Accordingly, as described in the above embodiments, a force is generated in a direction in which the second rotary body is coupled to the coupling regardless of a direction of deviation of axis. As a consequence, the robustness in regard to coupling of the coupling and the second rotary body is enhanced.

Aspect 21.

An image forming apparatus includes a main body (e.g., main body 1) and the drive transmission device included in the main body according to any one of Aspect 1 through Aspect 20.

Accordingly, as described in the above embodiments, the rotational irregularity of the rotary body is minimized for reliable image formation.

Aspect 22.

In Aspect 21, the image forming apparatus further includes a photoconductor. The rotary body is a flange disposed on one end of the photoconductor in a direction of a rotational axis of the photoconductor.

Accordingly, as described in the above embodiments, the rotational irregularity of the photoconductor is minimized. As a consequence, an image is reliably formed without causing a banding or uneven density.

Aspect 23.

In any one of Aspect 21 or Aspect 22, the image forming apparatus includes the drive transmission device of one of Aspect 7 through Aspect 13, and further includes a cover. The cover is openably closable relative to the main body, and covers the drive transmission device. The coupling releaser is moved in a direction to separate the coupling and the second rotary body in conjunction with opening and closing operations of the cover.

Accordingly, as described in the above embodiments, the unit to which a drive force is transmitted from the drive transmission device is efficiently replaced.

It is to be noted that the number of constituent elements and their locations, shapes, and so forth are not limited to any of the structure for performing the methodology illustrated in the drawings.

This disclosure references specific embodiments. It is to be noted that this disclosure is not limited to the details of the embodiments described above, but various modifications and enhancements are possible without departing from the scope of the disclosure. It is therefore to be understood that this disclosure may be practiced otherwise than as specifically described herein. For example, elements and/or features of different illustrative embodiments may be combined with each other and/or substituted for each other within the scope of this disclosure.

What is claimed is:

1. A drive transmission device comprising:
a first rotary body coupled to a drive source;
a second rotary body configured to receive a drive force transmitted from the drive source, the first rotary body and the second rotary body each including a plurality of grooves;
a coupling, including a first end coupled to the first rotary body and a second end axially opposed to the first end and coupled to the second rotary body, to couple the first rotary body and the second rotary body, the coupling including a plurality of couplers on a circumferential surface of each of the first end and the second end, the plurality of couplers being axially movable into and out of the plurality of grooves of each of the first rotary body and the second rotary body, and a spherical end face at the second end;
a spring configured to press the coupling toward the second rotary body from the first rotary body; and
a coupling releaser including a hole into which the coupling is inserted, to separate the coupling and the second rotary body,
wherein the hole of the coupling releaser is elongated in a longitudinal direction of the coupling releaser and includes an inner wall, and
wherein the coupling releaser is movable so that the inner wall of the hole of the coupling releaser contacts a circumferential surface of the coupling, to press the coupling against a force from the spring and to move the coupling axially toward the first rotary body to separate the coupling and the second rotary body.

2. The drive transmission device according to claim 1, wherein a radius of the circumferential surface of the first end of the coupling is relatively larger than a radius of the circumferential surface of the second end of the coupling.

3. The drive transmission device according to claim 1, wherein the circumferential surface of each of the first end and the second end of the coupling is spherical.

4. The drive transmission device according to claim 1, wherein the inner wall of the hole of the coupling releaser has a gradient equal to or substantially equal to a gradient of a circumferential surface of a truncated cone portion of the coupling.

5. The drive transmission device according to claim 1, wherein the coupling is hollowed out.

6. The drive transmission device according to claim 1, wherein the coupling is made of a resin material reinforced by carbon fibers or glass fibers.

7. The drive transmission device according to claim 1, wherein the coupling further includes a truncated cone portion between the first end and the second end, and wherein the truncated cone portion includes a circumferential surface inclined at an angle of 45 degrees or less with respect to a direction perpendicular to an axis of the truncated cone portion.

8. The drive transmission device according to claim 1, wherein different couplers of the plurality of couplers are used for different drive transmission depending on a rotational direction of the coupling.

9. The drive transmission device according to claim 8, wherein the plurality of couplers includes four couplers on the circumferential surface of each of the first end and the second end, and wherein the four couplers are used for drive transmission in a first rotational direction of the coupling and two of the four couplers are additionally used for drive transmission in a second rotational direction of the coupling opposite the first rotational direction.

10. The drive transmission device according to claim 8, wherein each of couplers of the plurality of couplers used for drive transmission in both a first rotational direction and a second rotational direction, opposite the first rotational direction, of the coupling includes a cross section shaped as a rectangle with rounded corners including a pair of planar portions parallel to each other and a pair of arc portions.

11. An image forming apparatus comprising:
a main body; and
a drive transmission device included in the main body, the drive transmission device including:
a first rotary body coupled to a drive source;
a second rotary body configured to receive a drive force transmitted from the drive source, the first rotary body and second rotary body each including a plurality of grooves;
a coupling, including a first end coupled to the first rotary body and a second end axially opposed to the first end and coupled to the second rotary body, to couple the first rotary body and the second rotary body,
the coupling including a plurality of couplers on a circumferential surface of each of the first end and the second end, the plurality of couplers being axially movable into and out of the plurality of grooves of each of the first rotary body and the second rotary body,
the coupling including a spherical end face at the second end; and
a spring configured to press the coupling toward the second rotary body from the first rotary body, wherein the coupling further includes a truncated cone portion between the first end and the second end, the truncated cone portion including a circumferential surface inclined with respect to an axis of the truncated cone portion, such that a radius of the circumferential surface of the first end of the coupling is relatively larger than a radius of the circumferential surface of the second end of the coupling.

12. The image forming apparatus of claim 11, wherein the drive transmission device further includes:
a coupling releaser including a hole into which the coupling is inserted, to separate the coupling and the second rotary body,
wherein the hole of the coupling releaser is elongated in a longitudinal direction of the coupling releaser and includes an inner wall, and
wherein the coupling releaser is moved so that the inner wall of the hole of the coupling releaser contacts a circumferential surface of the coupling, to press the coupling against a force from the spring and to move the coupling axially toward the first rotary body to separate the coupling and the second rotary body.

* * * * *